US011525642B2

(12) United States Patent
Isaacs et al.

(10) Patent No.: US 11,525,642 B2
(45) Date of Patent: Dec. 13, 2022

(54) THERMAL ENERGY STORAGE DEVICES, SYSTEMS, AND METHODS

(71) Applicant: Roccor, LLC, Longmont, CO (US)

(72) Inventors: Steven Isaacs, Fort Collins, CO (US); Greg Shoukas, Denver, CO (US); Diego Arias, Bellevue, WA (US)

(73) Assignee: Roccor, LLC, Longmont, CO (US)

( * ) Notice: Subject to any disclaimer, the term of this patent is extended or adjusted under 35 U.S.C. 154(b) by 0 days.

(21) Appl. No.: 15/785,570

(22) Filed: Oct. 17, 2017

(65) Prior Publication Data
US 2018/0106564 A1    Apr. 19, 2018

Related U.S. Application Data

(60) Provisional application No. 62/408,896, filed on Oct. 17, 2016.

(51) Int. Cl.
*B33Y 10/00* (2015.01)
*B22F 10/28* (2021.01)
(Continued)

(52) U.S. Cl.
CPC .............. *F28F 27/02* (2013.01); *B22F 10/28* (2021.01); *B33Y 10/00* (2014.12); *B33Y 80/00* (2014.12);
(Continued)

(58) Field of Classification Search
CPC ....................................................... F28F 27/02
See application file for complete search history.

(56) References Cited

U.S. PATENT DOCUMENTS 5,343,940 A  *  9/1994  Jean ................... F28D 15/0241
                                                                          165/104.33
9,374,904 B2     6/2016  Francis
                         (Continued)

FOREIGN PATENT DOCUMENTS

JP         H09206225 A  *  8/1997  ............. F28D 20/02
WO    WO2010056792       5/2010

OTHER PUBLICATIONS

Hall, Stephen. (2012). Rules of Thumb for Chemical Engineers (5th Edition)—References. Elsevier. (Year: 2012).*
(Continued)

*Primary Examiner* — Jophy S. Koshy
*Assistant Examiner* — Joshua S Carpenter
(74) *Attorney, Agent, or Firm* — Wilson Patent Law, LLC

(57) ABSTRACT

Methods, systems, and device for thermal energy storage are provided. For example, some embodiments include a thermal energy storage device that may include: a first casing wall; a second casing wall; and/or multiple support structures located between the first casing wall and the second casing wall. The multiple support structures may provide continuous thermal paths and/or continuous mechanical paths between the first casing wall and the second casing wall. The thermal energy storage device may be fabricated utilizing an additive manufacturing technique, such as direct laser metal sintering. Some embodiments may be manufactured utilizing printed metals, such as an aluminum alloy. In some embodiments, a phase-change material is charged between the first casing wall and the second casing wall. The phase-change material may include paraffin.

23 Claims, 21 Drawing Sheets

(51) Int. Cl.

| | | |
|---|---|---|
| *F28F 27/02* | (2006.01) | |
| *F28D 15/02* | (2006.01) | |
| *F28D 20/02* | (2006.01) | |
| *B33Y 80/00* | (2015.01) | |
| F28D 20/00 | (2006.01) | |
| F28F 21/08 | (2006.01) | |
| F28D 21/00 | (2006.01) | |

(52) U.S. Cl.
CPC ....... *F28D 15/0275* (2013.01); *F28D 20/023* (2013.01); *F28D 20/026* (2013.01); *F28D 2020/006* (2013.01); *F28D 2020/0008* (2013.01); *F28D 2021/0021* (2013.01); *F28F 21/084* (2013.01); *F28F 2255/18* (2013.01); *Y02E 60/14* (2013.01)

(56) References Cited

U.S. PATENT DOCUMENTS

| | | | |
|---|---|---|---|
| 10,458,716 B2 | 10/2019 | Hulse | |
| 2005/0135061 A1* | 6/2005 | Kiley | F28D 15/0266 361/700 |
| 2010/0038660 A1 | 2/2010 | Shuja | |
| 2011/0103011 A1* | 5/2011 | Koplow | F04D 25/0606 361/679.54 |
| 2013/0010464 A1 | 1/2013 | Shuja | |
| 2013/0228914 A1* | 9/2013 | Di Stefano | F28F 13/06 257/712 |
| 2014/0265810 A1 | 9/2014 | Livesay | |
| 2015/0233619 A1* | 8/2015 | Shedd | F25B 41/04 62/62 |
| 2015/0257249 A1* | 9/2015 | Kim | H05K 5/03 361/700 |
| 2016/0320149 A1* | 11/2016 | Poltorak | F28F 13/12 |
| 2016/0363378 A1* | 12/2016 | Hitzelberger | F28D 1/0477 |
| 2017/0064868 A1* | 3/2017 | Rush | H05K 7/20336 |
| 2017/0082372 A1* | 3/2017 | Vos | B23P 15/26 |
| 2017/0205150 A1 | 7/2017 | Safford-Smith | |
| 2017/0246850 A1 | 8/2017 | Arias | |
| 2018/0045471 A1* | 2/2018 | Dietrich | B22F 3/1055 |

OTHER PUBLICATIONS

Thompson et al. Additive manufacturing of heat exchangers: A case study on a multi-layered Ti—6Al—4V oscillating heat pipe. Additive Manufacturing. vol. 8, Oct. 2015, pp. 163-174 (Year: 2015).*

Google Patents machine translation of JPH09206225A retrieved on May 11, 2021 (Year: 1997).*

Ziaei, S., et al., "Constructal design for convection melting of a phase change body" International Journal of Heat and Mass Transfer, 99 (2016), pp. 762-769.

Choi, M., "Paraffin Phase Change Material for Maintaining Temperature Stability of IceCube Type of CubeSats in LEO," 13th International Energy Conversion Engineering Conference, Jul. 2015, pp. 1-22.

Hengeveld, D.W., et al., Hot- and Cold-Case Orbits for Robust Thermal Control, J. Spacecraft and Rockets, vol. 46, No. 6, 2009, pp. 1249-1260.

Lee, S.A., et al., "Thermal Vacuum Test of Ice as a Phase Change Material Integrated with a Radiator", 40th International Conference on Environmental Systems, Jul. 2010, pp. 1-10.

Choi, M., "Phase Change Material for Temperature Control of Imager or Sounder on GOES Type Satellites in GEO," 44th International Conference on Environmental Systems, Jul. 13-17, 2014, pp. 1-9.

Peyrou-Lauga, R., et al., "Phase Change Material Heat Storage Devices for Launchers and Orbiting Systems," 45th International Conference on Environmental Systems, Jul. 12-16, 2015, pp. 1-13.

Yamada, K., et al., "Heat Storage Panel Using a Phase-Change Material Encapsulated in a High-thermal conductivity CFRP for Micro Satellites," 44th International Conference on Environmental Systems, Jul. 13-17, 2014, pp. 1-12.

* cited by examiner

First Casing Wall 110-a

Multiple Support Structures 120

Second Casing Wall 110-b

Utilize an additive manufacturing technique to form a thermal energy storage device that includes a first casing wall, a second casing wall, and multiple support structures located between the first casing wall and the second casing wall where the multiple support structures provide at least continuous thermal paths or continuous mechanical paths between the first casing wall and the second casing wall ─ 710

FIG. 7A

THERMAL ENERGY STORAGE DEVICES, SYSTEMS, AND METHODS

CROSS-REFERENCES TO RELATED APPLICATIONS

This application is a non-provisional patent application claiming priority benefit of U.S. provisional patent application Ser. No. 62/408,896, filed on Oct. 17, 2016 and entitled "THERMAL ENERGY STORAGE DEVICES, SYSTEMS, AND METHODS," the entire disclosure of which is herein incorporated by reference for all purposes.

GOVERNMENT LICENSE RIGHTS

This invention was made with Government support under Contract NNX16CM36P awarded by the National Aeronautics and Space Administration. The Government has certain rights in the invention.

BACKGROUND

Different tools and techniques have generally been utilized for thermal management of space and/or terrestrial applications. There may, however, be significant gaps in thermal control system, such as those for control systems for small satellites. There may be a need for new tools and techniques for thermal energy storage.

SUMMARY

Methods, systems, and devices for thermal energy storage are provided. For example, some embodiments include a thermal energy storage device that may include: a first casing wall; a second casing wall; and/or multiple support structures located between the first casing wall and the second casing wall. The multiple support structures may provide at least continuous thermal paths or continuous mechanical paths between the first casing wall and the second casing wall.

In some embodiments, the first casing wall, the second casing wall, and/or the multiple support structures are fabricated from a printed metal; the printed metal may include aluminum; some embodiments may utilize titanium, nickel, copper, and/or alloys. The thermal energy storage device may be constructed utilizing laser metal sintering.

Some embodiments include a phase-change material disposed between the first casing wall and the second casing wall. The phase-change material may include paraffin.

Some embodiments include a charging inlet and/or a charging outlet. The charging inlet and/or the charging outlet may be positioned at opposite corners of the thermal energy storage device. Some embodiments may include at least one threaded hole, which may be part of the charging inlet or charging outlet in some examples. Some embodiments may include one or more undercut features.

In some embodiments, the multiple support structures include multiple rectangular fins. In some embodiments, the multiple support structures include multiple cylindrical pins. In some embodiments, the multiple support structures include two or more sizes and/or two or more spacing distances. In some embodiments, the multiple support structures include a tree-like structure.

Some embodiments include a heat source coupled with at least one casing wall. Some embodiments may include a heat strap.

Some embodiments include a method of forming a thermal energy storage device that may include utilizing an additive manufacturing technique to form the thermal energy storage device that may include a first casing wall, a second casing wall, and/or multiple support structures located between the first casing wall and the second casing wall. The multiple support structures may provide at least continuous thermal paths or continuous mechanical paths between the first casing wall and the second casing wall.

In some embodiments, the additive manufacturing technique utilizes a laser metal sintering technique. The laser metal sintering technique may utilize aluminum or other printed metals, such as titanium, copper, nickel, or alloys.

Some embodiments include charging the thermal energy storage device with a phase-change material. The phase-change material may include paraffin. In some embodiments, the charging utilizes a charging inlet and a charging outlet configured to reduce entrapment of air bubbles during the charging.

Some embodiments include coupling at least a heat source with the thermal energy storage device. This may include direct coupling between the heat source and thermal energy storage device, or indirect coupling, such as through the use of a heat strap. Some embodiments include polishing a surface of at least the first casing wall or the second casing wall. Some embodiments include treating the polished surface; treating the polished surfacing may include bonding a film to the surface, spraying a coating on the surface, plating the surface, anodizing the surface, and/or applying other films to the surface. Some embodiments include removing mechanically a portion of at least the first casing wall or the second casing wall to reduce a thickness of at least the first casing wall or the second casing wall. Some embodiments include forming one or more undercut features in at least the first casing wall or the second casing wall. Some embodiments may include surface finishing of one or more external surfaces of the first casing wall and/or the second casing wall utilizing fly cutting and/or sanding.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 1A shows a thermal energy storage device in accordance with various embodiments.

FIG. 7A shows a flow diagram of a method in accordance with various embodiments.

DETAILED DESCRIPTION

Figure 1B:
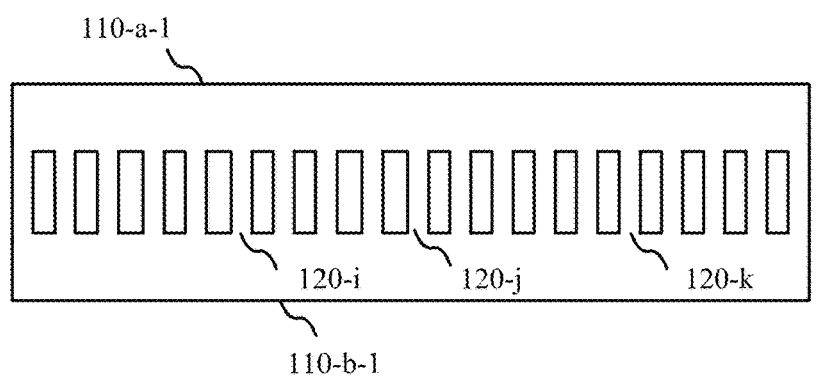
FIG. 1B shows a thermal energy storage device in accordance with various embodiments.

This description provides embodiments, and is not intended to limit the scope, applicability or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Thermal energy storage devices, systems, and methods are provided in accordance with various embodiments. The tools and techniques provided may be applicable for space and/or terrestrial applications. Some embodiments include a thermal energy storage device that may include a metal casing with an internal metal structure that may act as a mechanical load-bearing layer, as well as thermal conductivity enhancement material that may spread thermal energy into a phase-change material charged within the casing. The phase-change material utilized may include materials such as paraffin. In general, the phase-change material may act as a matrix material inside the metal casing. The use of a phase-change material may allow for the absorption, storage, and/or release of energy. Different embodiments may also be configured to utilize convective, conductive, and/or radiative heat transfer processes.

Tools and techniques for manufacturing the thermal energy storage devices provided in accordance with various embodiments may include additive manufacturing techniques. Such techniques may include the use of direct laser metal sintering (DLMS, which may informally be referred to as 3D printing). The material utilized to make the metal casing may in general include light weight metals such as aluminum or other printed metals, such as titanium, nickel, copper, or alloys.

The tools and techniques for manufacturing the thermal energy storage devices of various embodiments may provide a variety of benefits. For example, the use of additive manufacturing techniques may allow for monolithic construction without seams or joints. This may allow for continuous thermal and/or mechanical paths without obstructions (e.g., contact resistances) between surfaces, which may provide for better thermal conductivity and/or structural stability. In contrast, techniques that may join separate components such as casing walls and support structures (e.g., gluing, welding, or other joining processes) may not result in continuous thermal and/or mechanical paths; this may result in contact resistances. The tools and techniques provided in accordance with various embodiments may utilize processes that thus do not involve joining processes. Furthermore, the use of additive manufacturing techniques may avoid coefficient of thermal expansion (CTE) mismatch. CTE mismatch may result in cracking between different components. The tools and techniques provided in accordance with various embodiments utilizing additive manufacturing techniques may avoid the problems with the use of glues or other joining materials that may expand and contract at different rates from the materials that may be utilized to form support structures and/or casing walls; thus, some embodiments may avoid cracking unlike techniques that may utilize joining processes. Through the use of additive manufacturing of thermal storage devices in accordance with various embodiments, the lack of seams may provide for better performance through the creation of continuous thermal paths rather than heat having to pass through seams that may not conduct heat as well.

The tools and techniques for manufacturing the thermal energy storage devices of various embodiments may also allow for more fabrication complexity. For example, additive manufacturing techniques may allow for internal structures without the need for joining multiple parts. The tools and techniques provided may facilitate construction with internal continuous structures, such as support structures, between casing walls that would be difficult with joining techniques that may be more applicable for joining perimeters of such devices. Some features, such as undercut features, may also allow for unique charging inlets and/or outlets for filing and sealing (or plugging) a phase-change material within the thermal energy storage devices.

Turning now to FIG. 1A, a thermal energy storage device 100 is provided in accordance with various embodiments. Device 100 may include a first casing wall 110-*a*, a second casing wall 110-*b*, and/or multiple support structures 120 located between the first casing wall 110-*a* and the second casing wall 110-*b*. The multiple support structures 120 may provide at least continuous thermal paths or continuous mechanical paths between the first casing wall 110-*a* and the second casing wall 110-*b*.

In some embodiments of device 100, the first casing wall 110-*a*, the second casing wall 110-*b*, and/or the multiple support structures 120 are fabricated from a printed metal, such as aluminum. Some embodiments may utilize other printed metals, such as titanium, copper, nickel, or alloys. The thermal energy storage device 100 may be constructed utilizing an additive manufacturing technique, such as direct laser metal sintering. In some embodiments, other techniques may be utilized for manufacturing including lost wax techniques.

Figure 1C:
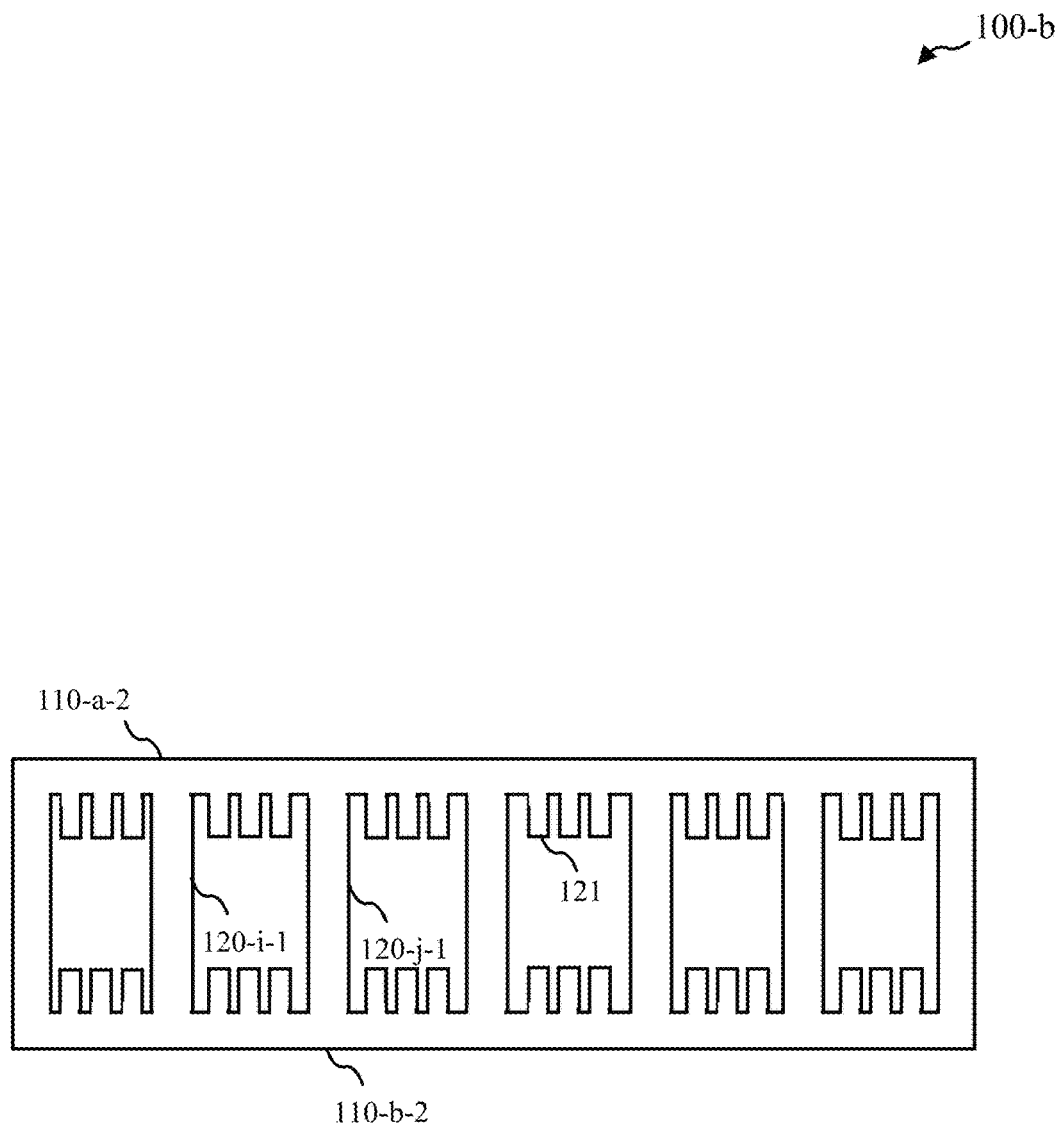
FIG. 1C shows a thermal energy storage device in accordance with various embodiments.

Some embodiments of device 100 include a phase-change material (not shown) disposed between the first casing wall 110-*a* and the second casing wall 110-*b*; see FIG. 1C, for example. The phase-change material may include paraffin. Some embodiments may include one or more additional phase-change materials.

Some embodiments of device 100 include charging inlet and/or a charging outlet (not shown); see FIG. 1C, for example. The charging inlet and/or the charging outlet may be positioned at opposite corners of the thermal energy storage device 100. Some embodiments of device 100 may include at least one threaded hole, which may be part of the charging inlet or charging outlet in some examples. Some embodiments may include one or more undercut features.

In some embodiments of device 100, the multiple support structures 120 include multiple rectangular fins. In some embodiments of device 100, the multiple support structures 120 include multiple cylindrical pins. In some embodiments of device 100, the multiple support structures 120 include two or more sizes or spacing distances. In some embodiments of device 100, the multiple support structures 120 include a tree-like structure.

Figure 1D:
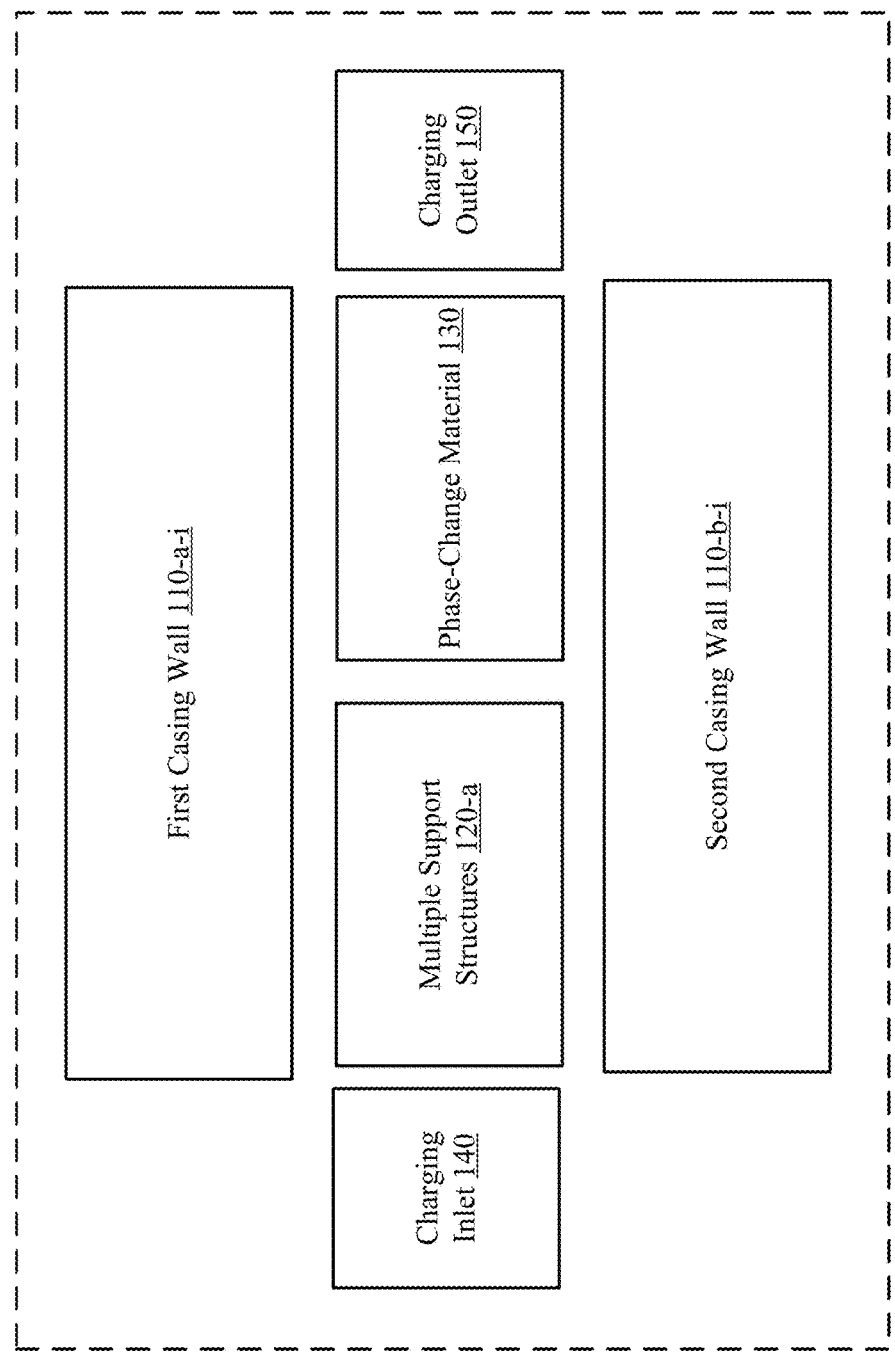
FIG. 1D shows a thermal energy storage device in accordance with various embodiments.
Figure 1E:
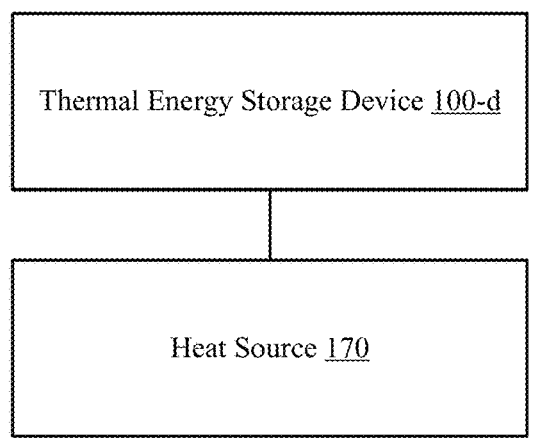
FIG. 1E shows a thermal energy storage system in accordance with various embodiments.

Some embodiments of device 100 include a heat source (not shown) coupled with at least one casing wall 110; see FIG. 1E, for example. This may include direct coupling between the heat source and device 100, or indirect coupling, such as through the use of a heat strap. Such examples may be referred to as thermal control systems.

In some embodiments of device 100, one or more of the structures 120 may not extend from the first casing wall 110-*a* to the second casing wall 110-*b*. Such structures 120 may provide for thermal performance but may not necessarily provide for structural support. For example, structures 120 may include small pillars that may not extend the length of the cavity between the first casing wall 110-*a* and the second casing wall 110-*b*. In some embodiments, one or more undercut features may be formed into at least the first casing wall 110-*a* and/or the second casing wall 110-*b*.

Turning now to FIG. 1B, a thermal energy storage device 100-*a* is provided in accordance with various embodiments. Device 100-*a* may be an example of device 100 of FIG. 1A.

Device 100-*a* may include a first casing wall 110-*a*-1, a second casing wall 110-*b*-1, and/or multiple support structures 120-*i*, 120-*j*, 120-*k* located between the first casing wall 110-*a*-1 and the second casing wall 110-*b*-1. In particular, device 100-*a* is shown to reflect that multiple support structures 120-*i*, 120-*j*, 120-*k* may provide continuous thermal and/or mechanical paths between the first casing wall 110-*a*-1 and the second casing wall 110-*b*-1. To form such at least continuous thermal paths or continuous mechanical paths, a variety of additive manufacturing techniques may be utilized. For example, some embodiments utilize a laser sintering technique. Different fabrication materials may be utilized, such as an aluminum alloy, though other materials may be utilized such as titanium, copper, or nickel; in general, printed metals may be utilized.

Turning now to FIG. 1C, a thermal energy storage device 100-*b* is provided in accordance with various embodiments. Device 100-*b* may be an example of device 100 of FIG. 1A and/or device 100-*a* of FIG. 1B.

Device 100-*b* may include a first casing wall 110-*a*-2, a second casing wall 110-*b*-2, and/or multiple support structures 120-*i*-1, 120-*j*-1 located between the first casing wall 110-*a*-2 and the second casing wall 110-*b*-2. In particular, device 100-*b* is shown to reflect that multiple support structures 120-*i*-1, 120-*j*-1 may provide continuous thermal and/or mechanical paths between the first casing wall 110-*a*-2 and the second casing wall 110-*b*-2. To form such at least continuous thermal paths and/or continuous mechanical paths, a variety of additive manufacturing techniques may be utilized. For example, some embodiments utilize a laser sintering technique. Different fabrication materials may be utilized, such as an aluminum alloy, though other materials may be utilized such as titanium, copper, or nickel; in general, printed metals may be utilized. Device 100-*b* may also include multiple structures 121, which may provide for thermal paths within the device 100-*b*, though they may not be continuous between the first casing wall 110-*a*-2 and the second casing wall 110-*b*-2.

Turning now to FIG. 1D, a thermal energy storage device 100-*c* is provided in accordance with various embodiments. Device 100-*c* may be an example of device 100 of FIG. 1A, device 100-*a* of FIG. 1B, and/or device 100-*b* of FIG. 1C.

Device 110-*c* may include a first casing wall 110-*a*-*i*, a second casing wall 110-*b*-*i*, and/or multiple support structures 120-*a* located between the first casing wall 110-*a*-*i* and the second casing wall 110-*b*-*i*. The multiple support structures 120-*a* may provide continuous thermal and/or mechanical paths between the first casing wall 110-*a*-*i* and the second casing wall 110-*b*-*i*.

Device 100-*c* may include a phase-change material 130 disposed between the first casing wall 110-*a*-*i* and the second casing wall 110-*b*-*i*. The phase-change material 130 may include paraffin, for example. Other phase-change materials may be utilized, including, but not limited to, water, tetradecane, hexadecane, octadecane, and/or eicosane. Knowledge of the different thermal properties of the phase-change materials may be relevant to the design of different thermal energy storage devices and the choice of phase-change material that may be utilized. In some cases, commercially available phase-change materials may exhibit a range of melt temperatures, which may be due to impurities and/or the presence of multiple material chemistries. Device 100-c may include two or more phase-change materials 130 disposed between wall 110-a-i and the second casing wall 110-b-i, although those phase-change materials may be in independent cavities so that the two or more phase-change materials may not mix. Some embodiments of device 100-c may include multiple, isolated phase-change material pockets within device 100-c; each pocket may have a different internal structure that may depend on its heat loads.

Device 100-c may include a charging inlet 140 and/or a charging outlet 150. The charging inlet 140 and the charging outlet 150 may be positioned at opposite corners of the thermal energy storage device 100-c. The charging inlet 140 and charging outlet 150 may be configured to reduce entrapment of air bubbles in the device 100-c. The charging inlet 140 and/or charging outlet 150 may include at least one threaded hole, which may facilitate sealing the device 100-c after charging with the phase-change material 130.

Turning now to FIG. 1E, a thermal energy storage system 101 is provided in accordance with various embodiments. System 101 may include a thermal energy storage device 100-d. Device 100-d may be an example of device 100 of FIG. 1A, device 100-a of FIG. 1B, device 100-b of FIG. 1C, and/or device 100-c of FIG. 1D System 101 may include one or more heat sources 170 that may be coupled with the thermal energy storage device 100-d. This coupling may be affected in a variety of ways, such as directly coupling to one of the casing walls of the thermal energy storage device 100-d. In some embodiments, a heat strap may be utilized to couple the heat source 170 to the thermal energy storage device 100-d. In some embodiments, a two-phase device, such as a heat pipe or oscillating heat pipe, may be utilized to couple the heat source 170 to the thermal energy storage device 100-d; in some embodiments, the two-phase device may be constructed utilizing an additive manufacturing technique.

In some embodiments, an arrangement of multiple support structures of the thermal energy storage device 100-d may be disposed between casing walls of the thermal energy storage device 100-d with respect to a position of the heat source 170. For example, the multiple support structures may include two or more sizes or spacing distances.

Figure 1F:
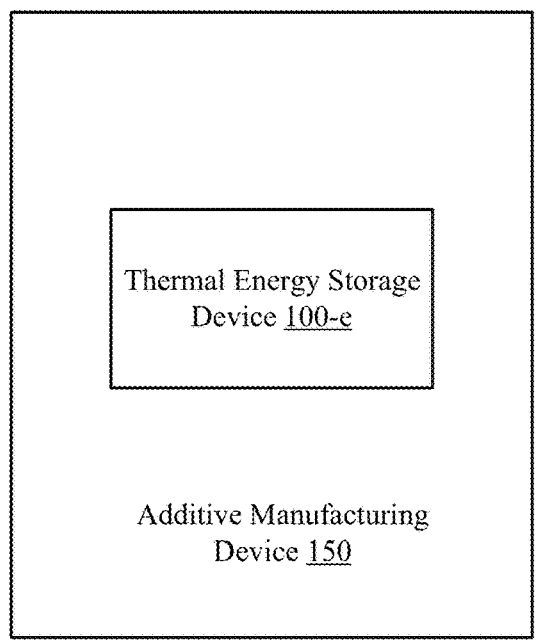
FIG. 1F shows a system for thermal energy storage device construction in accordance with various embodiments.

Turning now to FIG. 1F, a thermal energy storage system 102 is provided in accordance with various embodiments. System 102 may include a thermal energy storage device 100-e that may be formed utilizing an additive manufacturing device 150. Device 100-e may be an example of device 100 of FIG. 1A, device 100-a of FIG. 1B, device 100-b of FIG. 1C, device 100-c of FIG. 1D, and/or device 100-d of FIG. 1E.

The additive manufacturing device 150 may be utilized to form the thermal energy storage device 100-e that includes a first casing wall, a second casing wall, and multiple support structures located between the first casing wall and the second casing wall. The multiple support structures may provide at least continuous thermal paths or continuous mechanical paths between the first casing wall and the second casing wall.

In some embodiments, the additive manufacturing device 150 utilizes a laser metal sintering technique. The laser metal sintering technique may utilize aluminum or other printed metals, such as titanium, copper, nickel, or alloys.

Figure 2A:
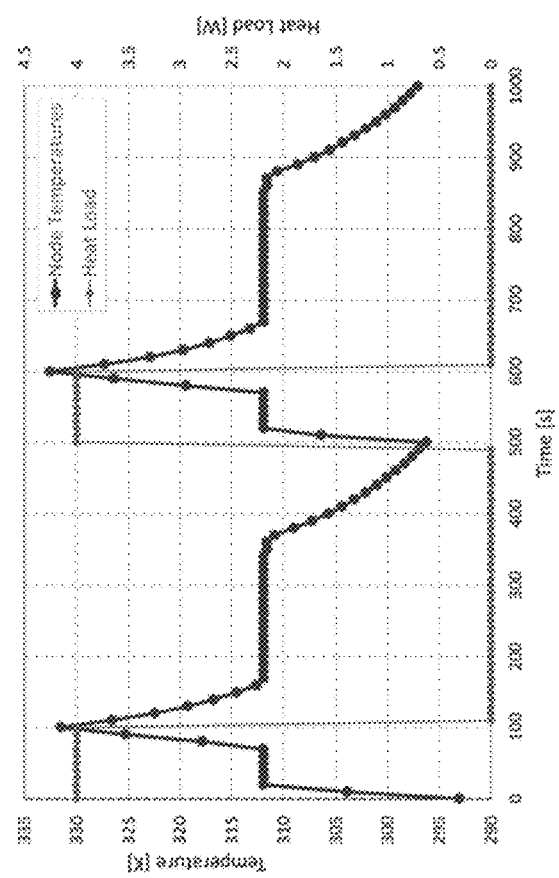
FIG. 2A shows a schematic model of a thermal energy storage device in accordance with various embodiments.
Figure 2A:
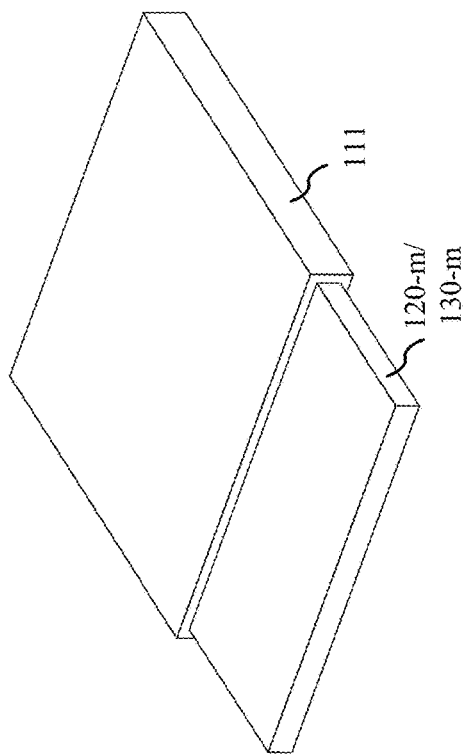

Turning now to FIG. 2A, a schematic model of a thermal energy storage device 200 is provided in accordance with various embodiments. Device 200 may be an example of device 100 of FIG. 1A, device 100-a of FIG. 1B, device 100-b of FIG. 1C, device 100-c of FIG. 1D, device 100-d of FIG. 1E, and/or device 100-e of FIG. 1F.

Device 200 may include a metal case 111 that may include multiple casing walls, such as casing walls 110 of devices 100 of FIGS. 1A, 1B, 1C, 1D, and/or 1E. Device 200 may include a phase-change material (PCM) 130-m, which may be an example of the phase-change material 130 of FIG. 1D. Device 200 may include metal structures 120-m, which may be examples of the multiple support structures 120 of devices 100 of FIGS. 1A, 1B, 1C, 1D, and/or 1E.

A theoretical model based on the schematic model of the thermal energy device 200 was developed in Thermal Desktop using solid brick elements. In order to model the phase change process, the properties of phase-change materials may be entered into the Thermal Properties panel using a fusion model, which may include a value of latent heat at a discrete melting temperature. For each phase-change material, a single value for effective thermal conductivity may be entered, based on the size of the metal support structure used in the particularly-designed panel. In order to represent the lateral conduction of the casing layer, the panel may be modeled using a material stack that included a bulk phase-change material-metal structure as the internal layer, surrounded by a metal layer.

To verify the behavior of the device 200, an example panel was modeled as a square panel, 10-cm in side, and 5-mm thick, and with a 1-mm thick metal case; other dimensions may be utilized in some embodiments. This example panel was discretized into 605 nodes, with one heat load and one sink temperature as boundary conditions. The heat load may be represented as a heat source with 2.7-cm in side. The following table may generally list the thermophysical properties used in this example:

| | |
|---|---|
| Thermal Conductivity | 0.5 W/m-K |
| Density | 818 kg/m$^3$ |
| Specific Heat | 2,950 J/kg-K |
| Latent Heat | 2,660 J/kg |
| Melt Temperature | 312 K. |

Merely by way of example, a heat load of 4.0 watts was applied during 100 seconds, and was turned off for 400 seconds. Graphs 210 may show the temperature of the nodes below the heat load; when the heat load is on, the temperature of the device 200 may increase until it reaches the melting temperature, and may remain at that temperature until it melts entirely, when the temperature may continue to increase until the heat load stops. At that point, the temperature may decrease until it reaches the melting temperature, when it may go through a freezing process. As the heat load cycles on and off, the temperature profile may repeat with each cycle.

Figure 2C:
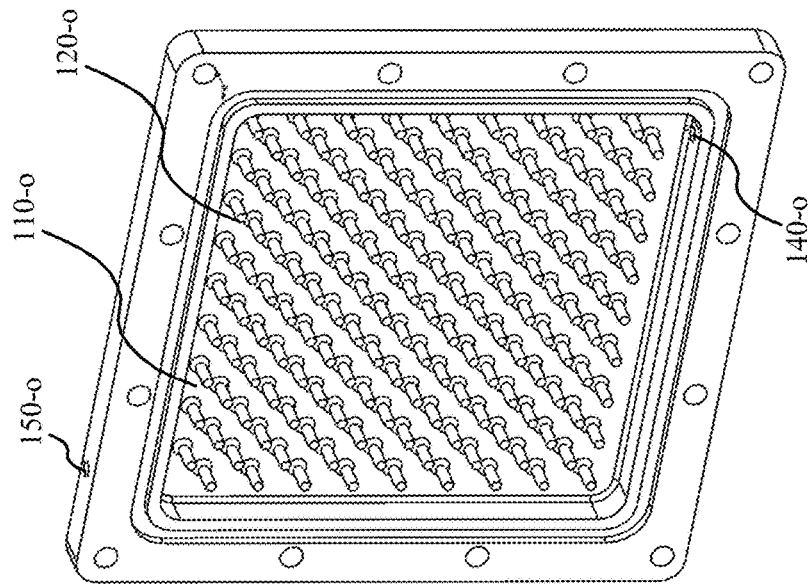
FIG. 2C shows a thermal energy storage device in accordance with various embodiments.
Figure 2B:
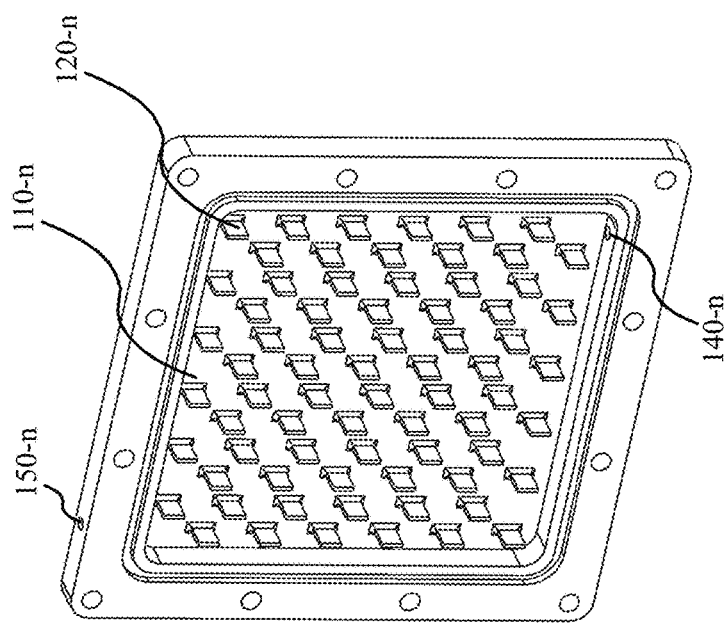
FIG. 2B shows a thermal energy storage device in accordance with various embodiments.

Turning now to FIG. 2B and FIG. 2C, two different thermal energy storage devices 200-a, 200-b, respectively, in accordance with various embodiments are provided. These devices may show, in particular, the internal layer of thermal energy storage devices, such as device 100 of FIG. 1A, device 100-a of FIG. 1B, device 100-b of FIG. 1C, device 100-c of FIG. 1D, device 100-d of FIG. 1E, device 100-e of FIG. 1E, and/or device 200 of FIG. 2A, in general.

Device 200-a may include rectangular fin array 120-n, while device 200-b may include cylindrical pin array 120-o. Arrays 120-o, 120-n may be examples of multiple support structures 120 of FIG. 1A, FIG. 1B, FIG. 1C, FIG. 1D, and/or FIG. 2A. Device 200-*b* may provide homogeneity over the entire device, and may provide for an independence of orientation preference during the filling process. Both device 200-*a* and device 200-*b* generally include charging inlets 140-*n*, 140-*o*, respectively, and charging outlets 150-*n*, 150-*o*, respectively. Device 200-*a* may show a first casing wall 110-*n*; device 200-*b* may show a first casing wall 110-*o*. A second casing wall may not be shown in order to show the internal layers of these devices.

A Finite Element Analysis was performed that may predict the response of devices such as those based on device 200-*b* to a large pressure difference between the internal cavity and the environment surrounding the panel. As a proof of concept, a pressure difference of 10 atmospheres between the internal and external surfaces was applied, and the yield strength and Poisson ratio of aluminum 6061 was used. This may be a conservative example, as one may not expect such pressure difference, but there is some uncertainty on the actual properties of the thermal energy storage device after it has been manufactured.

Figure 2D:
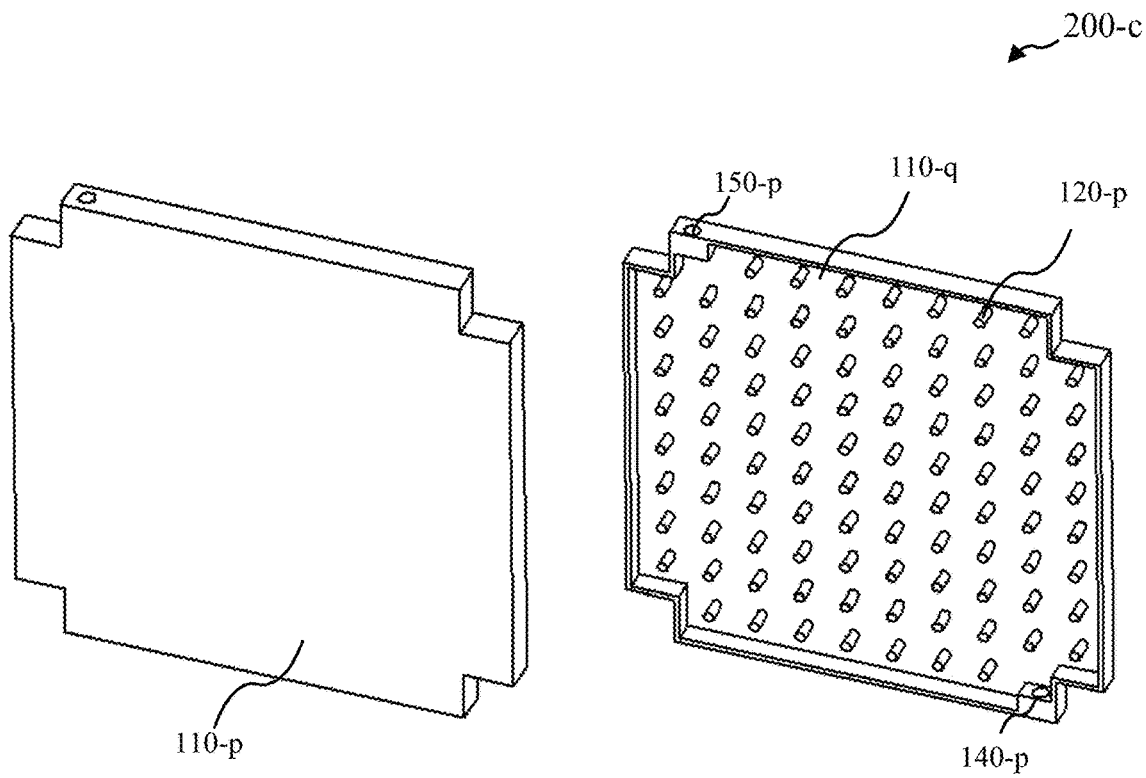
FIG. 2D shows a thermal energy storage device in accordance with various embodiments.

FIG. 2D provides another thermal energy storage device 200-*c* in accordance with various embodiments. Device 200-*c* may be an example of device 100 of FIG. 1A, device 100-*a* of FIG. 1B, device 100-*b* of FIG. 1C, device 100-*c* of FIG. 1D, device 100-*d* of FIG. 1E, device 100-*e* of FIG. 1F, and/or device 200 of FIG. 2A.

Device 200-*c* may show a first casing wall 110-*p*, a second casing wall 110-*q*, and multiple support structures 120-*p* configured as cylindrical pins; the first casing wall 110-*p* may be shown separately from the other components in order to show the internal layers of the device 200-*c*, though may be fabricated to provide continuous mechanical and/or thermal paths between the first casing wall 110-*p*, the second casing wall 110-*q*, and the multiple support structures 120-*p*. The device 200-*c* may be manufactured from an aluminum alloy, though other printed metals such as titanium, nickel, or copper may be utilized. Merely by way of example, device 200-*c* may form a 10×10 cm panel, 7-mm thick, with allowances for integration with main structure in a 1 U CubeSat. Other embodiments may be fabricated from other materials and/or may utilize different dimensions. Device 200-*c* may also show a charging inlet 140-*p* and charging outlet 150-*p*.

Figure 2E:
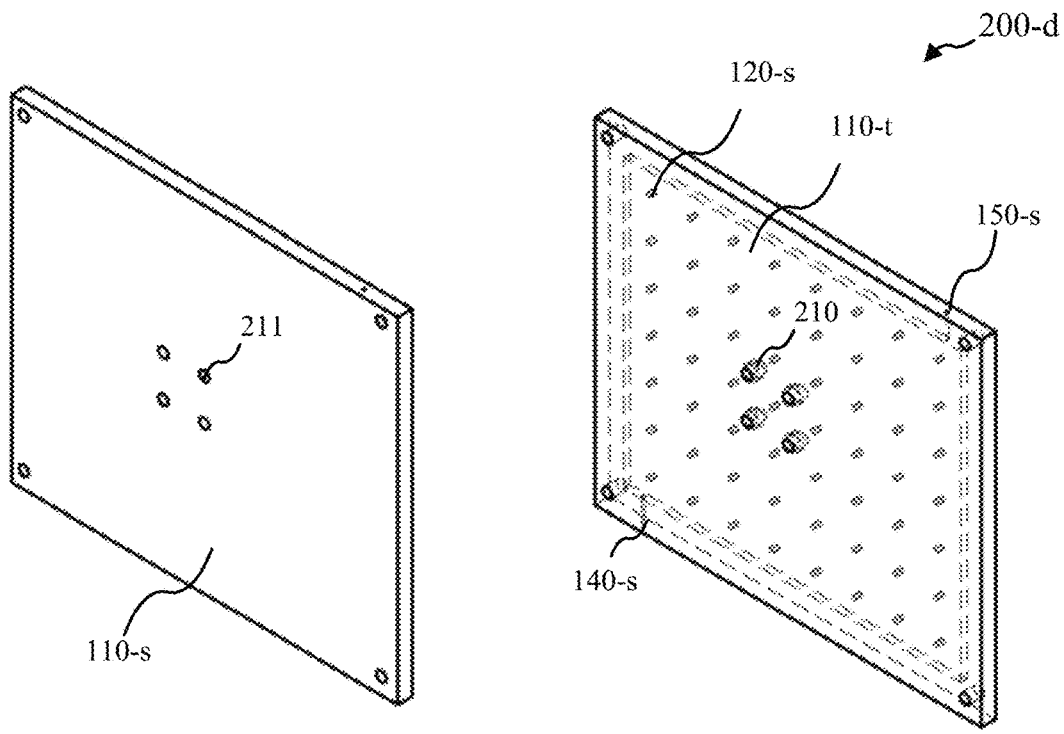
FIG. 2E shows a thermal energy storage device in accordance with various embodiments.

FIG. 2E provides another thermal energy storage device 200-*d* in accordance with various embodiments. Device 200-*d* may be an example of device 100 of FIG. 1A, device 100-*a* of FIG. 1B, device 100-*b* of FIG. 1C, device 100-*c* of FIG. 1D, device 100-*d* of FIG. 1E, device 100-*e* of FIG. 1F, and/or device 200 of FIG. 2A.

Device 200-*d* may show a first casing wall 110-*s*, a second casing wall 110-*t*, and multiple support structures 120-*s* configured as cylindrical pins; the first casing wall 110-*s* may be shown separately from the other components in order to show the internal layers of the device 200-*d*, though may be fabricated to provide continuous mechanical and/or thermal paths between the first casing wall 110-*s*, the second casing wall 110-*t*, and the multiple support structures 120-*s*. Device 200-*d* may be manufactured from an aluminum alloy, though other printed metals may be utilized, such as titanium, copper, or nickel. Merely by way of example, device 200-*d* may form a 10×10 cm panel, 5 mm thick, with mounting points 210 and through-holes 211 for attachment of heat strap or other devices. Other embodiments may be fabricated from other materials and/or may utilize different dimensions. Device 200-*d* may also show a charging inlet 140-*s* and charging outlet 150-*s*.

The following table may provide characteristics of these two devices 200-*c* and 200-*d* in accordance with some embodiments; other devices in accordance with various embodiments may have other characteristic values.

|  | Device 200-c | Device 200-d |
| --- | --- | --- |
| Panel thickness (mm) | 7.0 | 2.5 |
| Wall thickness (mm) | 1.0 | 0.5 |
| Energy capacity (kJ) | 9.7 | 1.9 |
| Void fraction (%) | 97% | 99% |
| Effective thermal conductivity (W/m-K) | 0.26 | 0.24 |
| Total mass (g) | 98 | 35 |

Figure 2F:
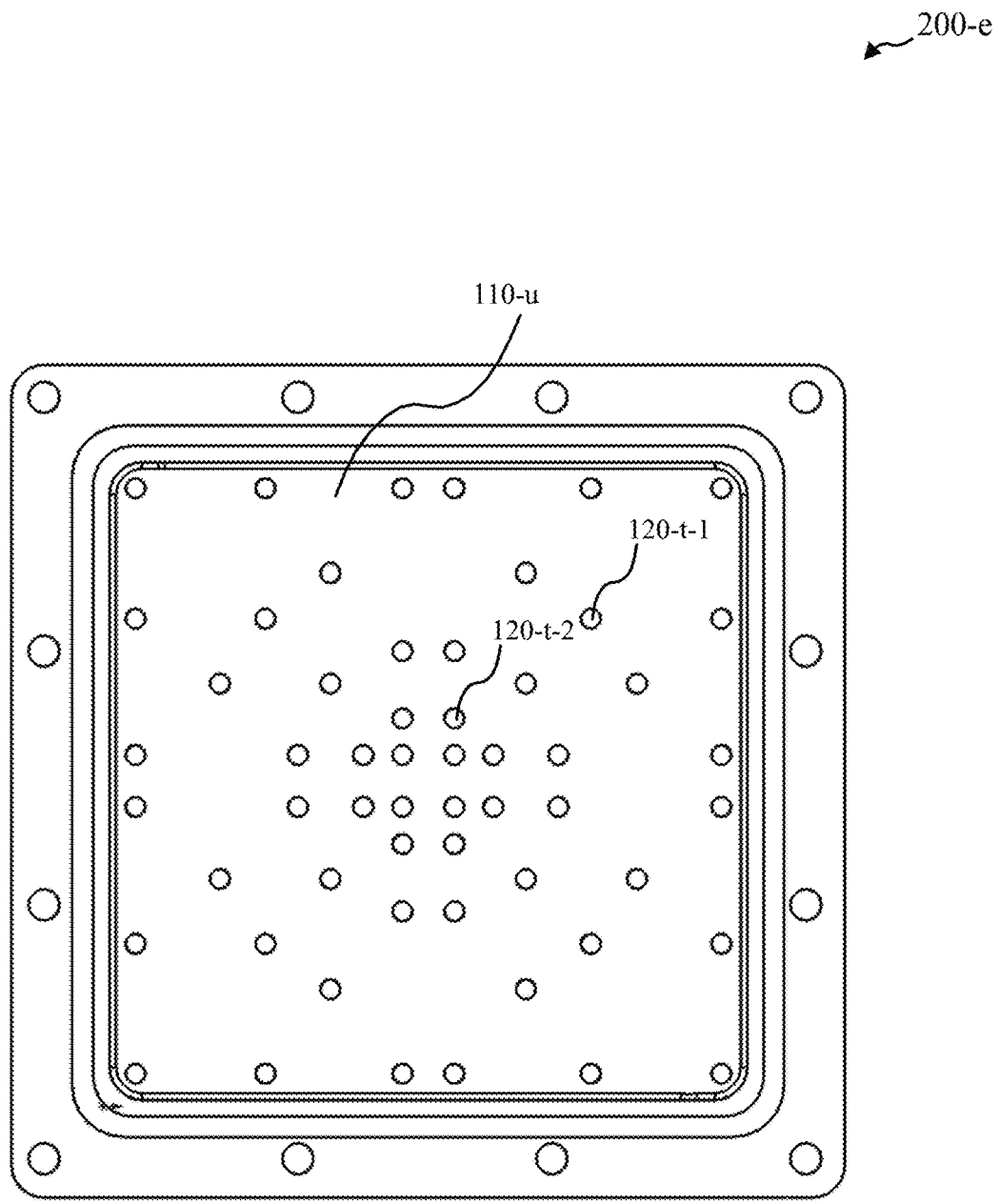
FIG. 2F shows a thermal energy storage device in accordance with various embodiments.

Turning now to FIG. 2F, a cross-sectional view of a thermal energy storage device 200-*e* is shown in accordance with various embodiments are provided. Device 200-*e* may show, in particular, the internal layer of thermal energy storage devices, such as device 100 of FIG. 1A, device 100-*a* of FIG. 1B, device 100-*b* of FIG. 1C, device 100-*c* of FIG. 1D, device 100-*d* of FIG. 1E, device 100 of FIG. 1F, and/or device 200 of FIG. 2A.

Device 200-*e* may include cylindrical pin array with multiple support structures, such as 120-*t*-1/120-*t*-2. Device 200-*e* may show an example where the multiple support structures include two or more spacing distances. Device 200-*e* may also show a first casing wall 110-*u*. A second casing wall may not be shown in order to show the internal layer of this device.

Figure 2G:
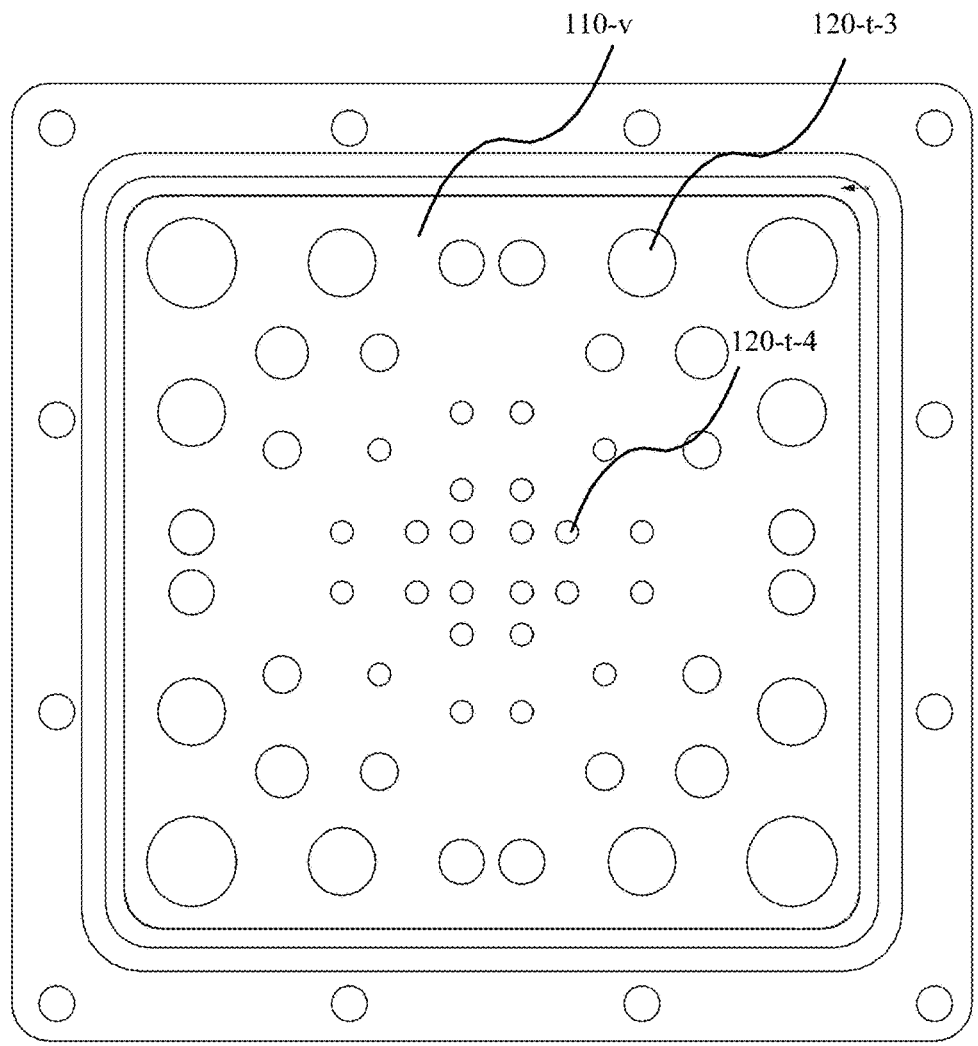
FIG. 2G shows a thermal energy storage device in accordance with various embodiments.

Turning now to FIG. 2G, a cross-sectional view of a thermal energy storage device 200-*f* is shown in accordance with various embodiments are provided. Device 200-*f* may show, in particular, the internal layer of thermal energy storage devices, such as device 100 of FIG. 1A, device 100-*a* of FIG. 1B, device 100-*b* of FIG. 1C, device 100-*c* of FIG. 1D, device 100-*d* of FIG. 1E, device 100-*e* of FIG. 1F, and/or device 200 of FIG. 2A Device 200-*f* may include cylindrical pin array with multiple support structures, such as 120-*t*-3/120-*t*-4. Device 200-*f* may show an example where the multiple support structures include two or more sizes and spacing distances. Device 200-*f* may also show a first casing wall 110-*v*. A second casing wall may not be shown in order to show the internal layer of this device.

Figure 2H:
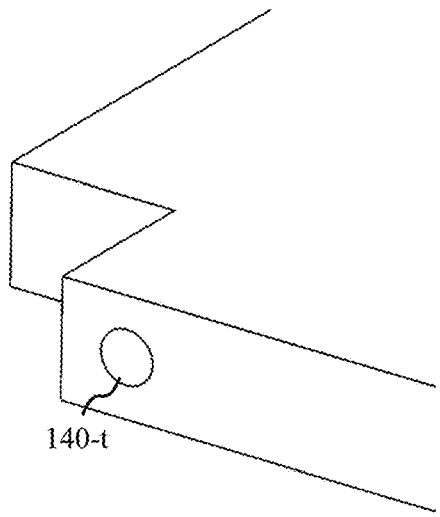
FIG. 2H shows a thermal energy storage device in accordance with various embodiments.
Figure 2H:
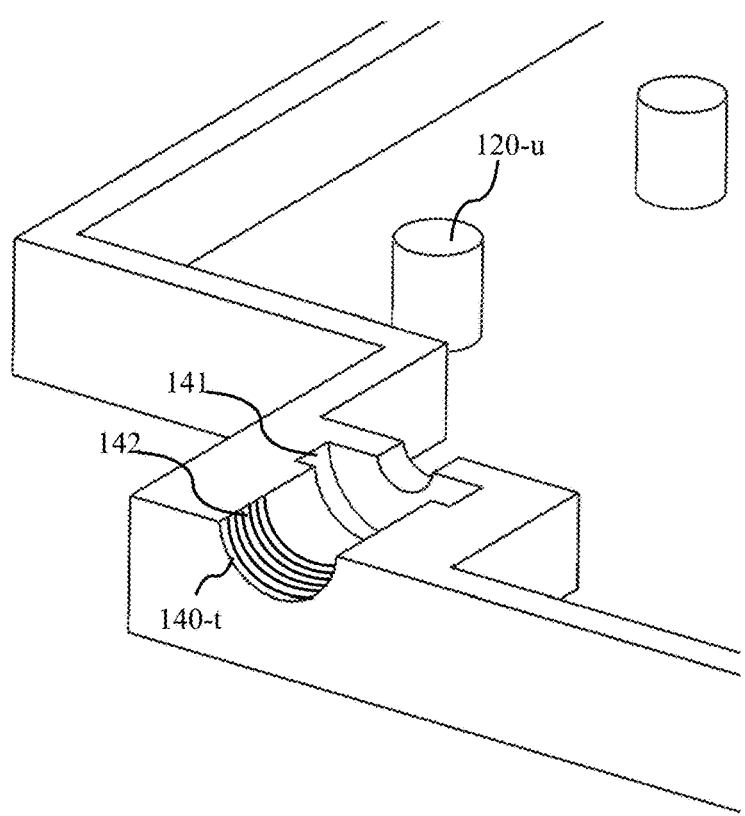

FIG. 2H shows two perspectives 200-*g*-1, 200-*g*-2 of a thermal energy storage device in accordance with various embodiments. Perspective 200-*g*-2 may provide, in particular, a cross-sectional view showing the internal layer of thermal energy storage devices, such as device 100 of FIG. 1A, device 100-*a* of FIG. 1B, device 100-*b* of FIG. 1C, device 100-*c* of FIG. 1D, device 100-*d* of FIG. 1E, device 100-*e* of FIG. 1F, and/or device 200 of FIG. 2A, in general; perspective 200-*g*-1 may show the external layer(s) of the thermal energy storage device.

Perspectives 200-*g*-1.200-*g*-2 may both shown aspects of a charging inlet 140-*t*. The cross-sectional view of perspective 200-*g*-2 may also show an undercut feature 141 that may be formed utilize the variety of techniques discussed. Perspective 200-*g*-2 may also through threading 142 that may be formed as part of an inlet and/or outlet. Perspective 200-*g*-2 may also show one or more support structures 120-*u*.

Figure 3A:
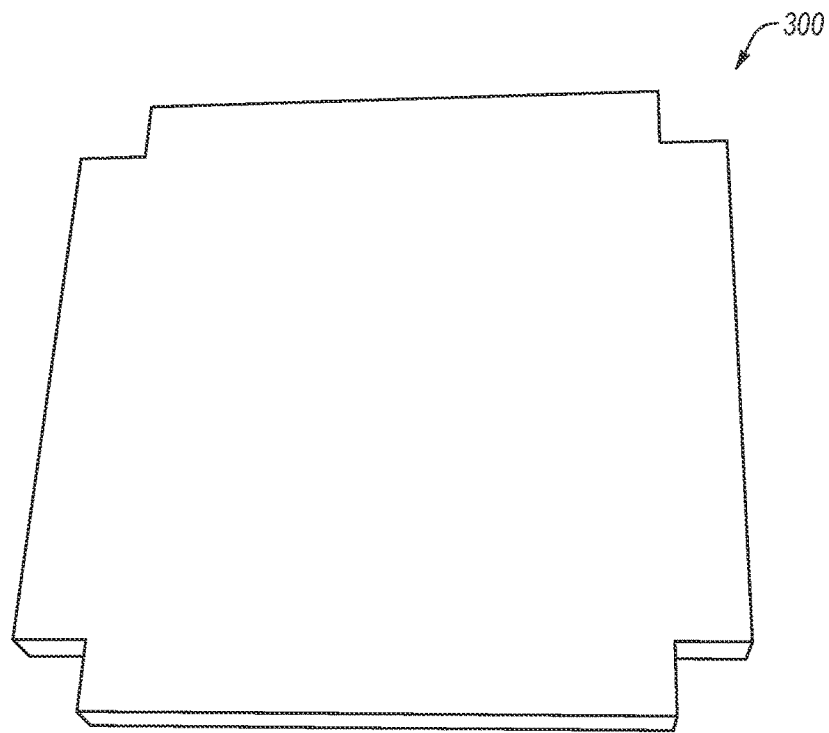
FIG. 3A shows a thermal energy storage device in accordance with various embodiments.
Figure 3B:
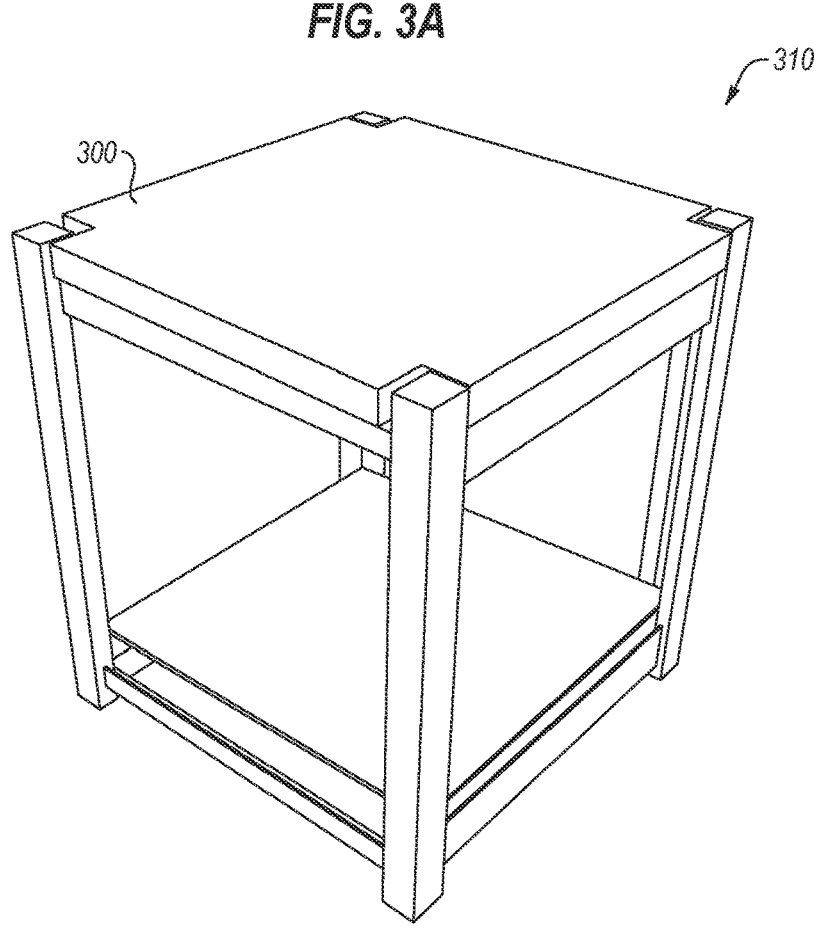
FIG. 3B shows a thermal energy storage device in accordance with various embodiments.

Turning now to FIG. 3A and FIG. 3B, a thermal energy storage device 300 in accordance with various embodiments is provided. Device 300 may be an example of device 100 of FIG. 1A, device 100-a of FIG. 1B, device 100-b of FIG. 1C, device 100-c of FIG. 1D, device 100-d of FIG. 1E, device 100-e of FIG. 1F, device 200 of FIG. 2A, device 200-a of FIG. 2B, device 200-b of FIG. 2C, device 200-c of FIG. 2D, device 200-d of FIG. 2E, device 200-e of FIG. 2F, device 200-f of FIG. 2G, and/or device 200-g of FIG. 2H. FIG. 3B shows a system 310 that may include the integration of device 300 into a 1 U CubeSat.

Figure 3C:
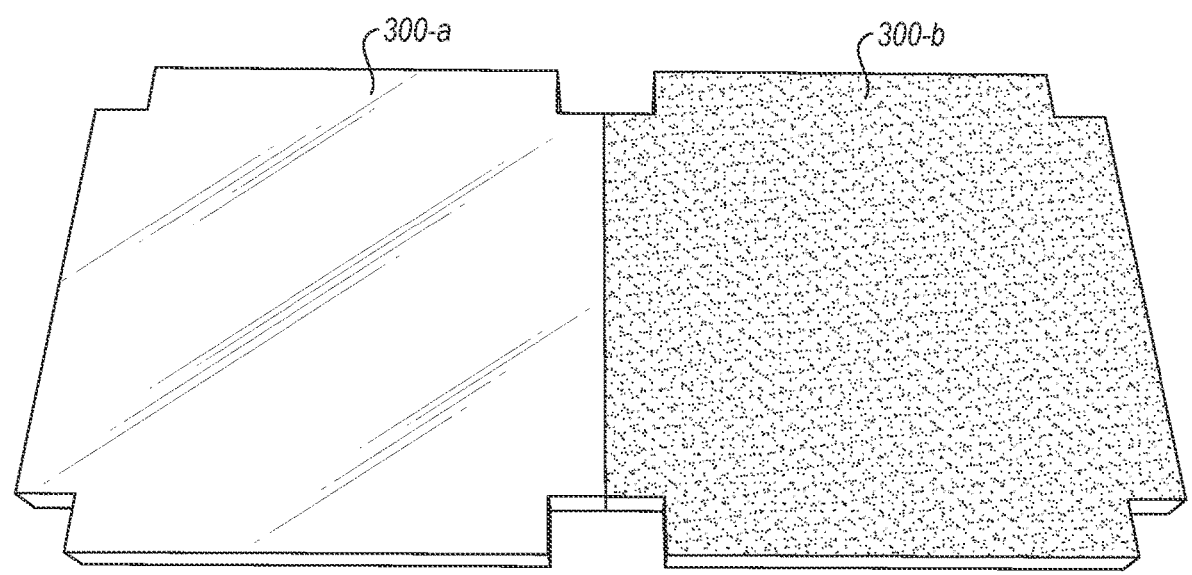
FIG. 3C shows thermal energy storage devices in accordance with various embodiments.

FIG. 3C shows examples of thermal energy storage devices 300-a and 300-b in accordance with various embodiments. Devices 300-a and 300-b may be examples of device 100 of FIG. 1A, device 100-a of FIG. 1B, device 100-b of FIG. 1C, device 100-c of FIG. 1D, device 100-d of FIG. 1E, device 100-e of FIG. 2F, device 200 of FIG. 2A, device 200-a of FIG. 2B, device 200-b of FIG. 2B, device 200-c of FIG. 2D, device 200-d of FIG. 2E, device 200-e of FIG. 2F, device 200-f of FIG. 2G, and/or device 200-g of FIG. 2H and/or device 300 of FIG. 3A. In particular, device 300-a may include the use of an additional step in manufacturing with appropriate surface finish. Right out of manufacturing, the parts of different thermal energy storage devices in accordance with various embodiments (see device 300-b for example) may have a rough surface finish. It may be possible to polish the external surface in order to have a flat surface, as may be shown with respect to device 300-a. This surface finish may be advantageous if a film with specific optical properties may be bonded on top of the panel, for example. In general, the polished surface of device 300-a may be treated in a variety of ways, such as bonding a film to the surface, spraying a coating on the surface, plating the surface, anodizing the surface, and/or applying other films to the surface. In addition, it may be possible to manufacture the different thermal energy storage devices in accordance with various embodiments with a particular wall thickness that may be required for the additive manufacturing steps, such as with direct laser metal sintering, and then may be mechanically removing material to reduce the wall thickness. Some embodiments may include surface finishing of one or more external surfaces of the device 300-a utilizing fly cutting and/or sanding.

Figure 4A:
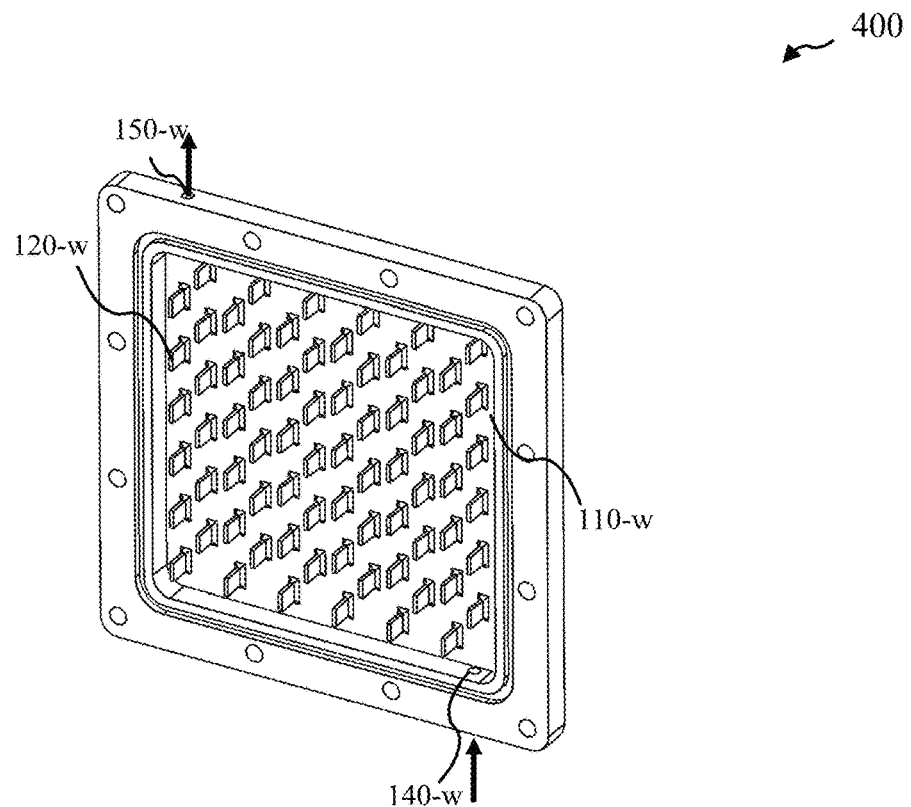
FIG. 4A shows a thermal energy storage device in accordance with various embodiments.

Turning now to FIG. 4A, an internal view of a thermal energy storage device 400 in accordance with various embodiments is provided. Device 400 may be an example of device 100 of FIG. 1A, device 100-a of FIG. 1B, device 100-b of FIG. 1C, device 100-c of FIG. 1D, device 100-d of FIG. 1E, device 100-e of FIG. 1F, device 200 of FIG. 2A, device 200-a of FIG. 2B, and/or device 300 of FIG. 3A. Device 400 may include, in particular, a charging inlet 140-w and a charging outlet 150-w. Device 400 also shows a configuration with a rectangular fin array for its multiple support structures 120-w in accordance with various embodiments; device 400 also shows a casing wall 110-w in accordance with various embodiments; an additional casing wall may be included in device 400, though not explicitly shown in order to be able to provide the internal view of the device.

Device 400 may be constructed as an aluminum direct laser metal sintering design, with the internal structure designed to be "3D printed" at the same time as the casing or pane walls 110-w, which may effectively create a continuous thermal and mechanical path between one wall, the structure, and the other wall. In this embodiment, device 400e may include the rectangular fins, separated by a distance of 1-cm, and the resulting mass and void fraction. Other separation distances may be utilized. Similar embodiments may utilize cylindrical supports.

Figures 4B, 4C:
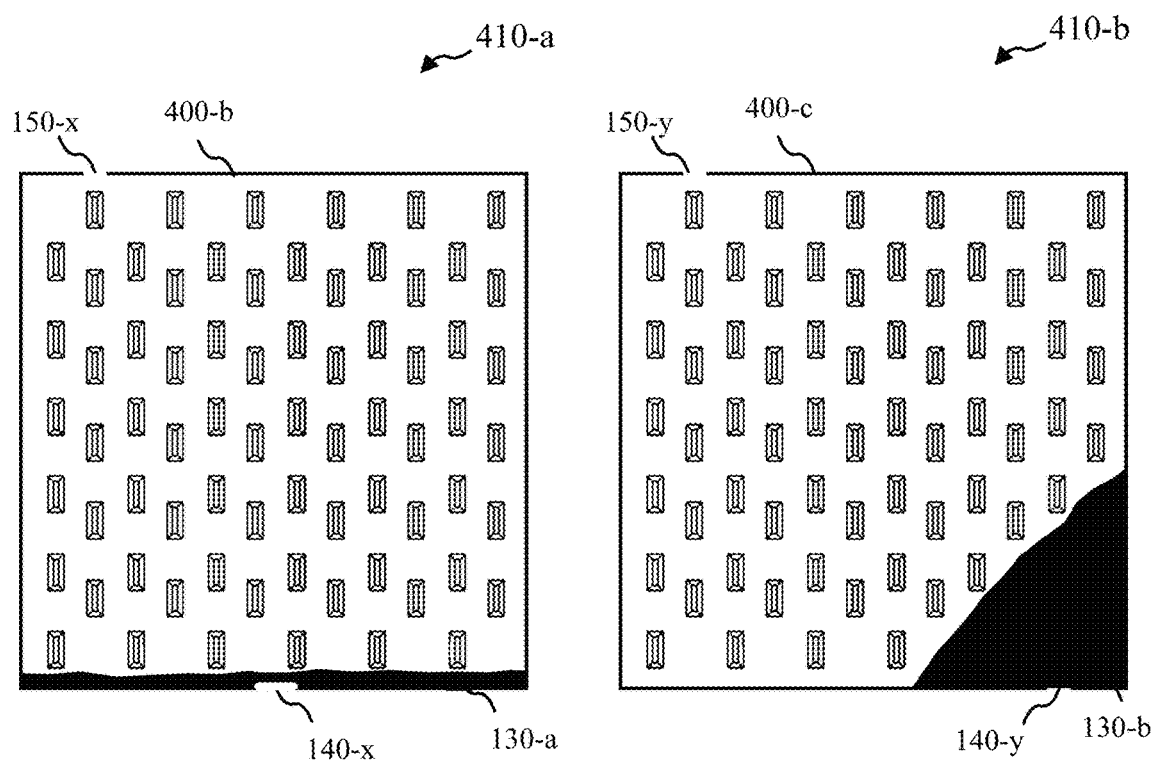
FIG. 4B shows a filling process for a thermal energy storage device in accordance with various embodiments.
FIG. 4C shows a filling process for a thermal energy storage device in accordance with various embodiments.

Turning now to FIG. 4B and FIG. 4C, filling or charging processes 410-a and 410-b, respectively, are shown with respect to different thermal energy storage devices 400-b and 400-c utilizing charging fluids 130-a, 130-b, respectively, in accordance with various embodiments. Device 400-b and/or device 400-c may be an example of device 100 of FIG. 1A, device 100-a of FIG. 1B, device 100-b of FIG. 1C, device 100-c of FIG. 1D, device 100-d of FIG. 1E, device 100-e of FIG. 1F, and/or device 400 of FIG. 4A. These figures may show how internal support structure design may affect the charging process. Computational Fluid Dynamics (CFD) analyses were used to predict the charging process if the charging inlet was located in the center (see FIG. 4B, ref num. 140-x) of the panel, or towards one of the edges (see FIG. 4C, ref. number 140-y). FIG. 4B and FIG. 4C may show the intermediate steps in the filling process predicted with CFD, when the charging inlet 140-x is located in the middle of the bottom edge (see FIG. 4B) and the panel is filled vertically, and when the charging inlet 140-y is located towards one end (see FIG. 4C) of the bottom edge and the panel is filled at 45°. The simulations may use the volume-of-fluid method, and the thermophysical properties of liquid paraffin wax. There were generally no discernable practical differences between the two methods, although it was thought that if a rectangular fin array is to be used, it might be beneficial to align the fins with the filling orientation. Charging fluids 130-a, 130-b may be examples of phase-change material, such as paraffin. In some embodiments, one or more additional charging fluids may be utilized. These configurations may help to reduce entrapment of air bubbles during the charging. Devices 400-b and 400-c may also include charging outlets 150-x, 150-y, respectively.

Figure 4D:
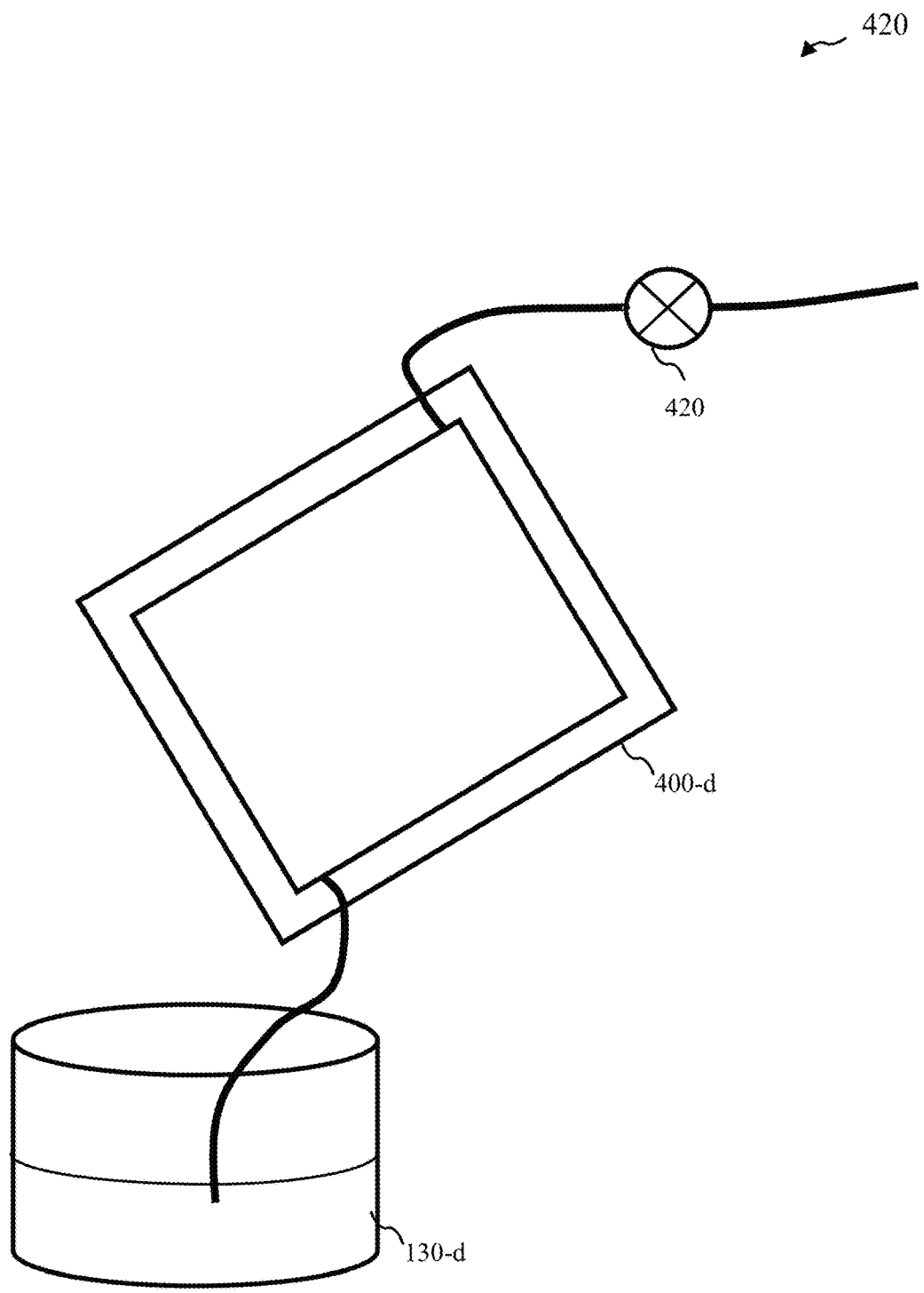
FIG. 4D shows a system for charging a thermal energy storage device in accordance with various embodiments.

FIG. 4D shows a system 420 for charging a thermal energy storage device 400-d in accordance with various embodiments. Device 400-d may be an example of device 100 of FIG. 1A, device 100-a of FIG. 1B, device 100-b of FIG. 1C, device 100-c of FIG. 1D, device 100-d of FIG. 1E, device 100-e of FIG. 1F, device 200 of FIG. 2A, device 200-a of FIG. 2B, device 200-b of FIG. 2C, device 200-c of FIG. 2D, device 200-d of FIG. 2E, device 200-e of FIG. 2F, device 200-f of FIG. 2G, device 300 of FIG. 3A or FIG. 3B, device 300-a or device 300-b of FIG. 3C, device 400 of FIG. 4A, device 400-b of FIG. 4B, and/or device 400-c of FIG. 4C. A general charging procedure may include the following. A phase-change material 130-d, such as paraffin, may be melted. Other phase-change materials 130-d besides paraffin may be utilized, including, but not limited to, water, tetradecane, hexadecane, octadecane, and/or eicosane. The thermal energy storage device 400-d may be pre-heated. The charging outlet may be connected to a vacuum pump 420 the thermal energy storage device 400-d may be evacuated. The charging inlet may be connected to the melted phase-change material through tubing immersed in the melted phase change material. The liquid phase-change material may be allowed to fill the thermal energy storage device 400-d. This procedure may help reduce entrapment of air bubbles during the charging procedure.

Figure 5:
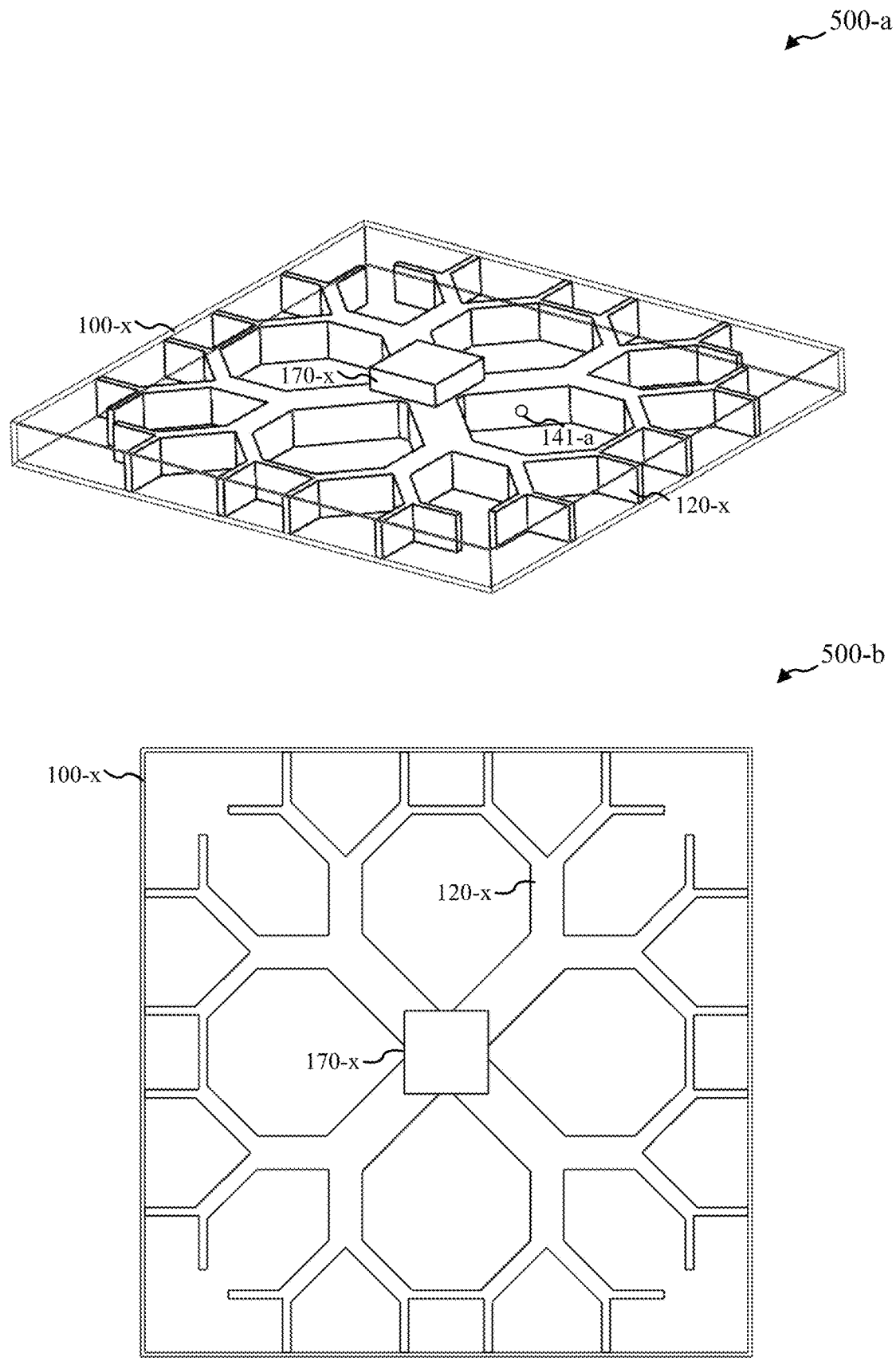
FIG. 5 shows two different views of a thermal energy storage device in accordance with various embodiments.

Turning now to FIG. 5, two different views 500-a and 500-b of a thermal energy device 100-x in accordance with various embodiments are provided. Device 100-x may be an example of device 100 of FIG. 1A, device 100-a of FIG. 1B, device 100-b of FIG. 1C, device 100-c of FIG. 1D, device 100-d of FIG. 1E, device 100-e of FIG. 1F, device 200 of FIG. 2A, device 200-a of FIG. 2B, device 200-b of FIG. 2C, device 200-c of FIG. 2D, device 200-d of FIG. 2E, device 200-e of FIG. 2F, device 200-f of FIG. 2G, device 200-g of FIG. 2H, device 300 of FIG. 3A or FIG. 3B, device 300-a or device 300-*b* of FIG. 3C, device 400 of FIG. 4A, device 400-*b* of FIG. 4B, device 400-*c*, and/or device 400-*d* of FIG. 4D. Device 100-*x* may provide an example of how different internal structures may be utilized in different embodiments. Different internal structures may have different impacts on the temperature variation of the thermal energy storage device 100-*x* and electric components. In particular, views 500-*a* and 500-*b* show support structures 120-*x* configured as tree-like patterns. Such tree-like patterns may help improve the melting of the phase-change material. This structure 120-*x* may prove beneficial for localized heat sources 170-*x* on some thermal energy storage devices, such as larger devices. Apertures, openings, or undercut features 141-*a* may be formed within the structure 120-*x*, which may allow for a fluid, such as a phase-change material, to be charged into device 100-*x*.

Figure 6:
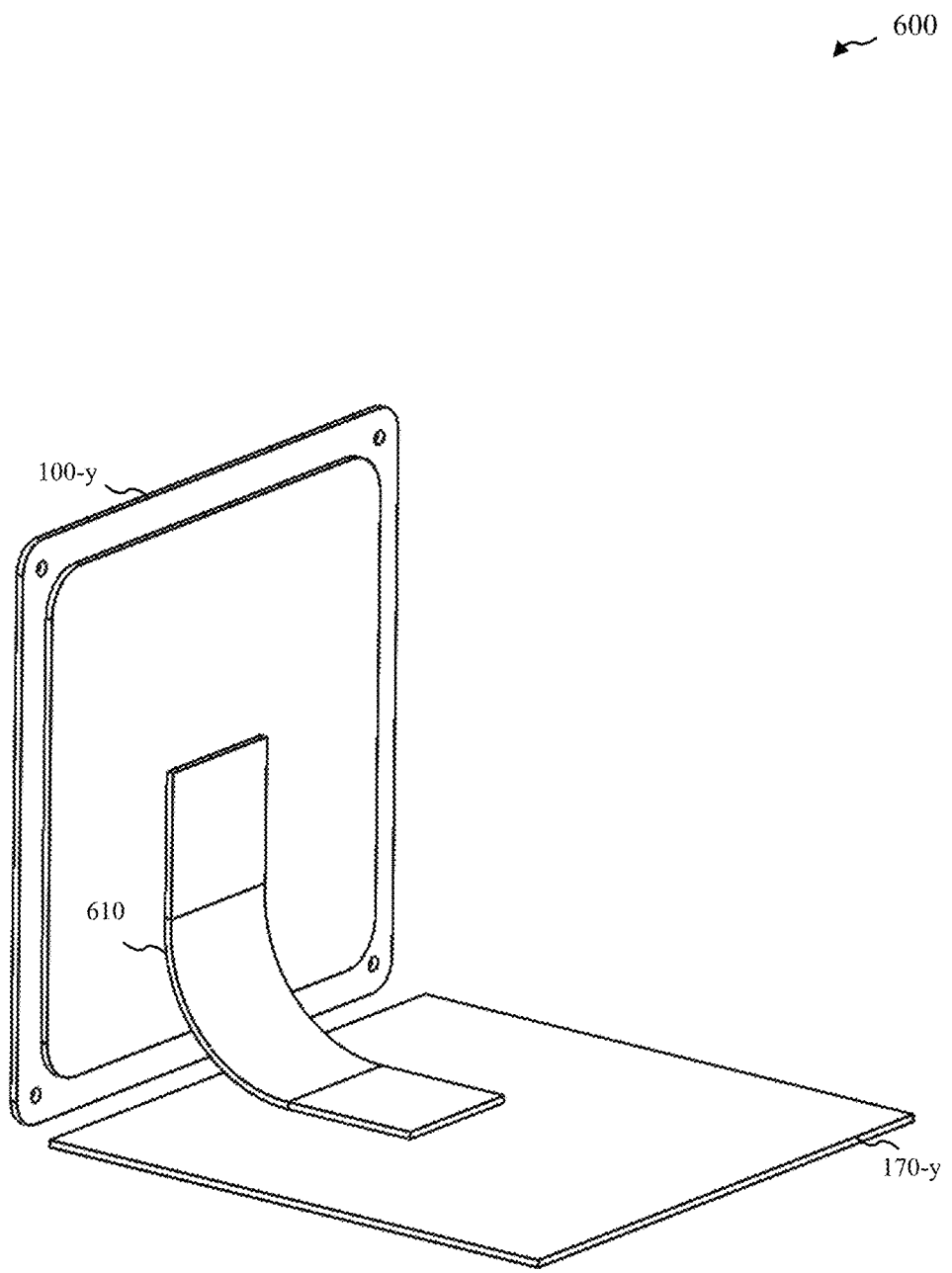
FIG. 6 shows a thermal energy storage system in accordance with various embodiments.

FIG. 6 shows a system 600 in accordance with various embodiments. System 600 may include a thermal energy storage device 100-*y*. Device 100-*y* may be an example of device 100 of FIG. 1A, device 100-*a* of FIG. 1B, device 100-*b* of FIG. 1C, device 100-*c* of FIG. 1D, device 100-*d* of FIG. 1E, device 100-*e* of FIG. 1F, device 200 of FIG. 2A, device 200-*a* of FIG. 2B, device 200-*b* of FIG. 2C, device 200-*e* of FIG. 2D, device 200-*d* of FIG. 2E, device 200-*e* of FIG. 2F, device 200-*f* of FIG. 2G, device 200-*g* of FIG. 2H, device 300 of FIG. 3A or FIG. 3B, device 300-*a* or device 300-*b* of FIG. 3C, device 400 of FIG. 4A, device 400-*b* of FIG. 4B, device 400-*c*, device 400-*d* of FIG. 4D, and/or device 100-*x* of FIG. 5. System 600 may be an example of system 101 of FIG. 1D. System 600 may also include one or more heat sources 170-*y*. Device 100-*y* may be coupled with the one or more heat sources; system 600 shows an example where a heat strap 610 may be utilized to couple these components with each other. This system may provide for both thermal energy storage and thermal transport. In this example, the heat strap 610 may be utilized to heat and/or cool device 100-*y*; the heat strap 610 may also be utilized to heat and/or cool the electronic components. Other tools and techniques may be utilized to couple the thermal energy storage device 100-*y* to the electronics besides a heat strap, such as a heat pipe, thermal ground plane, or other heat conductors.

Turning now to FIG. 7A, a flow diagram of a method 700 is shown in accordance with various embodiments. Method 700 may be implemented utilizing a variety of systems and/or devices such as those shown and/or described with respect to FIG. 1A, FIG. 1B, FIG. 1C, FIG. 1D, FIG. 1E, FIG. 1F, FIG. 2A, FIG. 2B, FIG. 2C, FIG. 2D, FIG. 2E, FIG. 2F, FIG. 2G, FIG. 2H, FIG. 3A, FIG. 3B, FIG. 3C, FIG. 4A, FIG. 4B, FIG. 4C, FIG. 4D, FIG. 5, and/or FIG. 6.

At block 710, an additive manufacturing technique may be utilized to form a thermal energy storage device that includes a first casing wall, a second casing wall, and multiple support structures located between the first casing wall and the second casing wall. The multiple support structures may provide at least continuous thermal paths or continuous mechanical paths between the first casing wall and the second casing wall.

In some embodiments of method 700, the additive manufacturing technique utilizes a laser metal sintering technique. The laser metal sintering technique may utilize aluminum or other printed metals, such as titanium, copper, nickel, or alloys.

Some embodiments of method 700 include charging the thermal energy storage device with a phase-change material. The phase-change material may include paraffin. In some embodiments, the charging utilizes a charging inlet and a charging outlet configured to reduce entrapment of air bubbles during the charging.

Some embodiments of method 700 include coupling at least a heat source with the thermal energy storage device. This may include direct coupling between the heat source and thermal energy storage device, or indirect coupling, such as through the use of a heat strap. Some embodiments include polishing a surface of at least the first casing wall or the second casing wall. Some embodiments include treating the polished surface; treating the polished surfacing may include bonding a film to the surface, spraying a coating on the surface, plating the surface, anodizing the surface, and/or applying other films to the surface. Some embodiments include removing mechanically a portion of at least the first casing wall or the second casing wall to reduce a thickness of at least the first casing wall or the second casing wall. Some embodiments may include surface finishing of one or more external surfaces of the first casing and/or the second casing utilizing fly cutting and/or sanding. Some embodiments include forming one or more undercut features in at least the first casing wall or the second casing wall.

Figure 7B:
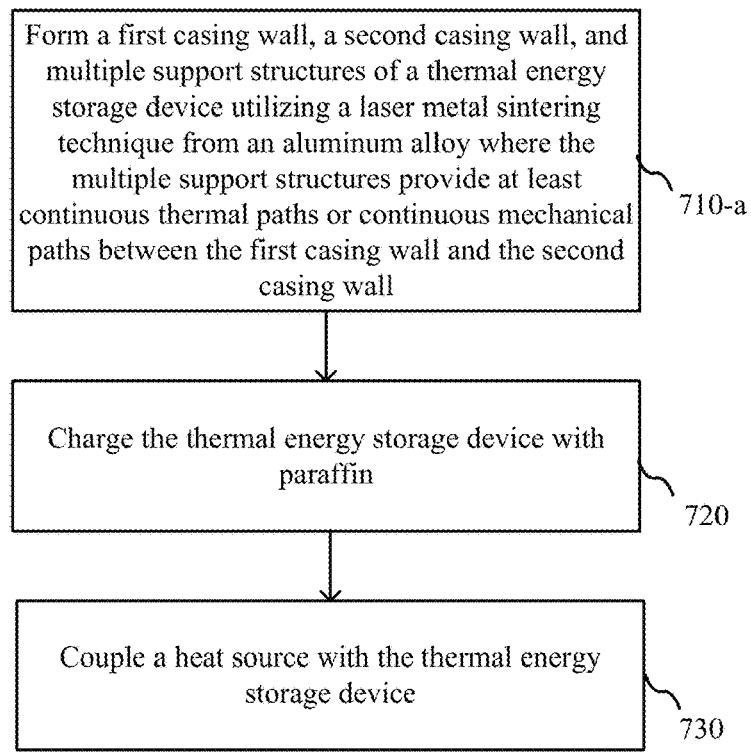
FIG. 7B shows a flow diagram of a method in accordance with various embodiments.

Turning now to FIG. 7B, a flow diagram of a method 700-*a* is shown in accordance with various embodiments. Method 700-*a* may be implemented utilizing a variety of systems and/or devices such as those shown and/or described with respect to FIG. 1A, FIG. 1B, FIG. 1C, FIG. 1D, FIG. 1E, FIG. 1F, FIG. 2A, FIG. 2B, FIG. 2C, FIG. 2D, FIG. 2E, FIG. 2F, FIG. 2G, FIG. 2H, FIG. 3A, FIG. 3B, FIG. 3C, FIG. 4A, FIG. 4B, FIG. 4C, FIG. 4D, FIG. 5, and/or FIG. 6. Method 700-*a* may be an example of method 700 of FIG. 7A.

At block 710-*a*, a first casing wall, a second casing wall, and multiple support structures of a thermal energy storage device may be formed utilizing a laser metal sintering technique from an aluminum alloy. The multiple support structures may provide continuous thermal and/or mechanical paths between the first casing wall and the second casing wall.

At block 720, the thermal energy storage device may be charged with paraffin. Other phase-change materials besides paraffin may be utilized, including, but not limited to, water, tetradecane, hexadecane, octadecane, and/or eicosane.

At block 730, a heat source may be coupled with the thermal energy storage device. In some embodiments, the position of the multiple support structures may be increased with respect to the positioning of the heat source. For example, the multiple support structures may include two or more sizes or spacing distances.

Figure 7C:
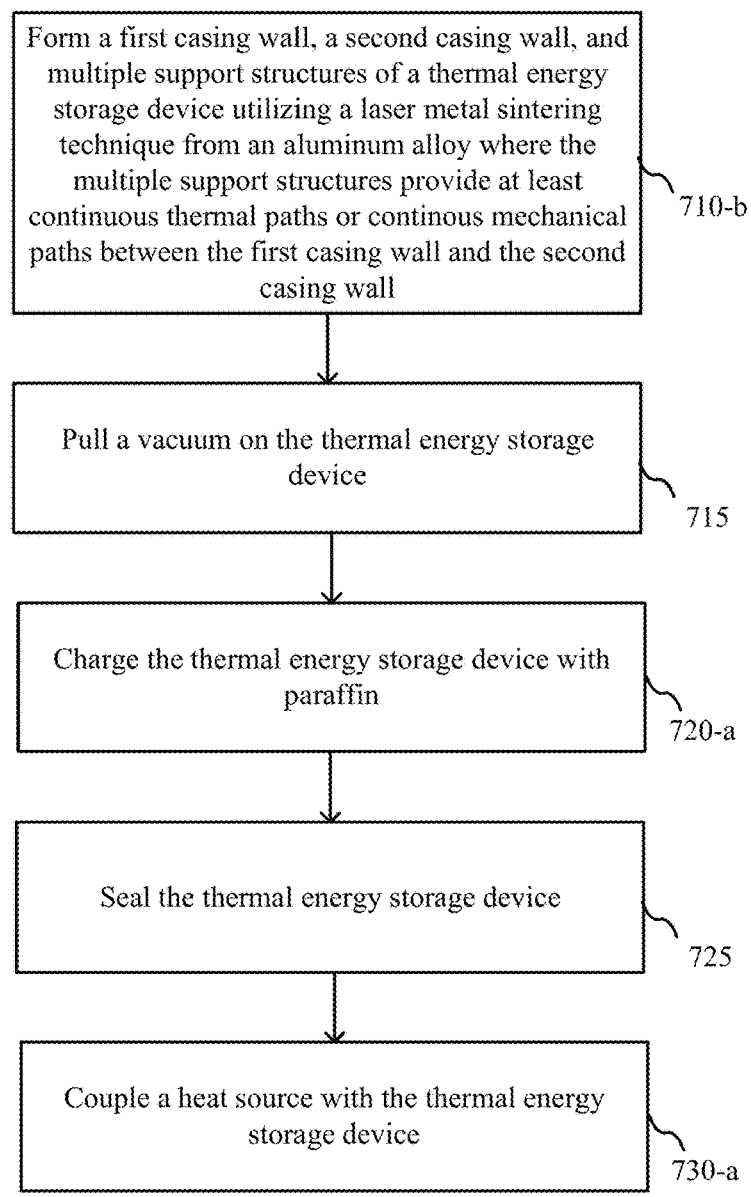
FIG. 7C shows a flow diagram of a method in accordance with various embodiments.

Turning now to FIG. 7C, a flow diagram of a method 700-*b* is shown in accordance with various embodiments. Method 700-*b* may be implemented utilizing a variety of systems and/or devices such as those shown and/or described with respect to FIG. 1A, FIG. 1B, FIG. 1C, FIG. 1D, FIG. 1E, FIG. 1F, FIG. 2A, FIG. 2B, FIG. 2C, FIG. 2D, FIG. 2E, FIG. 2F, FIG. 2G, FIG. 2H, FIG. 3A, FIG. 3B, FIG. 3C, FIG. 4A, FIG. 4B, FIG. 4C, FIG. 4D, FIG. 5, and/or FIG. 6. Method 700-*c* may be an example of method 700 of FIG. 7A and/or method 700-*a* of FIG. 7B.

At block 710-*b*, a first casing wall, a second casing wall, and multiple support structures of a thermal energy storage device may be formed utilizing a laser metal sintering technique from an aluminum alloy. The multiple support structures may provide continuous thermal and/or mechanical paths between the first casing wall and the second casing wall.

At block 715, a vacuum may be pulled on the thermal energy storage device. This may be particularly relevant for space-based applications. At block 720-a, the thermal energy storage device may be charged with paraffin or some other phase-change material.

At block 725, the thermal energy storage device may be sealed. At block 730-a, a heat source may be coupled with the thermal energy storage device.

These embodiments may not capture the full extent of combination and permutations of materials and process equipment. However, they may demonstrate the range of applicability of the method, devices, and/or systems. The different embodiments may utilize more or less stages than those described.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

What is claimed is:

1. A method of forming a thermal energy storage device comprising:
    utilizing an additive manufacturing technique to form the thermal energy storage device that includes a first casing wall, a second casing wall, and a plurality of support structures located between the first casing wall and the second casing wall, wherein the plurality of support structures provide at least continuous thermal paths or continuous mechanical paths between the first casing wall and the second casing wall and the plurality of support structures form a plurality of separate regions within the thermal energy storage device and the plurality of support structures are configured as one or more tree-like patterns, wherein at least one of the tree-like patterns includes:
        a first portion that extends from the first casing wall to the second casing wall and has a first width;
        a second portion that extends from the first casing wall to the second casing wall and has a second width, wherein the first width is greater than the second width;
        a third portion that extends from the first casing wall to the second casing wall and has a third width, wherein the first width is greater than the third width and the second portion and the third portion branch from the first portion;
        a fourth portion that extends from the first casing wall to the second casing wall and has a fourth width, wherein the second width is greater than the fourth width; and
        a fifth portion that extends from the first casing wall to the second casing wall and has a fifth width, wherein the second width is greater than the fifth width and the fourth portion and the fifth portion branch from the second portion;
    wherein utilizing the additive manufacturing technique to form the thermal energy storage devices further includes forming one or more apertures through one or more of the plurality of support structures;
    melting a phase-change material;
    pre-heating the thermal energy storage device prior to charging the thermal energy storage device with the phase-change material in a melted state;
    charging the thermal energy storage device with the phase-change material in the melted state, wherein at least a portion of the phase-change material in the melted state decreases below a melt temperature of the phase-change material within the thermal energy storage device and at least a portion of the phase-change material in the melted state passes through one or more of the one or more apertures through the one or more of the plurality of support structures such that the phase-change material in the melted states passes from at least a first separate region from the plurality of separate regions within the thermal energy storage device to a second separate region from the plurality of separate regions within the thermal energy storage device during the charging of the thermal energy storage device; and
    sealing the thermal energy storage device after charging the thermal energy storage device with the phase-change material.

2. The method of claim 1, wherein the additive manufacturing technique utilizes a laser metal sintering technique.

3. The method of claim 1, wherein the phase-change material includes paraffin.

4. The method of claim 1, wherein the charging utilizes a charging inlet and a charging outlet configured to reduce entrapment of air bubbles during the charging.

5. The method of claim 1, further comprising coupling a heat source with the thermal energy storage device.

6. The method of claim 1, further comprising polishing a surface of at least the first casing wall or the second casing wall.

7. The method of claim 1, further comprising removing mechanically a portion of at least the first casing wall or the second casing wall to reduce a thickness of at least the first casing wall or the second casing wall.

8. The method of claim 1, further comprising forming one or more undercut features in at least the first casing wall or the second casing wall.

9. The method of claim 1, wherein the plurality of support structures include a plurality of cylindrical pins.

10. The method of claim 1, further comprising forming a charging inlet and a charging outlet in the thermal energy storage device utilizing the additive manufacturing technique.

11. The method of claim 1, further comprising storing latent heat within the thermal energy storage device through melting the phase-change material within the thermal energy storage device.

12. The method of claim 1, wherein the plurality of separate regions include a plurality of isolated pockets.

13. The method of claim 2, wherein the laser metal sintering technique utilizes aluminum.

14. The method of claim 5, further comprising coupling the thermal energy storage device with the heat source utilizing a heat strap.

15. The method of claim 6, further comprising treating the polished surface.

16. The method of claim 9, wherein the plurality of cylindrical pins include two or more sizes with respect to the plurality of cylindrical pins.

17. The method of claim 9, wherein the plurality of cylindrical pins include two or more spacing distances with respect to the plurality of cylindrical pins.

18. The method of claim 10, wherein the charging inlet and the charging outlet each include at least a threaded portion.

19. The method of claim 10, wherein sealing the thermal energy storage device after charging the thermal energy storage device with the phase-change material includes plugging the charging inlet and the charging outlet.

20. The method of claim 10, further comprising connecting the charging outlet with a pump.

21. The method of claim 18, wherein the charging inlet and the charging outlet each include at least an undercut, non-threaded portion.

22. The method of claim 11, wherein heat from a heat source coupled with the thermal energy storage device melts the phase-change material within the thermal energy storage device.

23. The method of claim 20, further comprising pulling a vacuum on the thermal energy device utilizing the pump.

* * * * *